US012459765B2

(12) United States Patent
Itozaki et al.

(10) Patent No.: US 12,459,765 B2
(45) Date of Patent: Nov. 4, 2025

(54) CONTROL DEVICE, NON-TRANSITORY COMPUTER READABLE MEDIUM STORING CONTROL PROGRAM, AND FEEDING DEVICE

(71) Applicant: FUJIFILM Business Innovation Corp., Tokyo (JP)

(72) Inventors: Yusuke Itozaki, Kanagawa (JP); Yoshiaki Watanabe, Kanagawa (JP); Yuichi Adachi, Kanagawa (JP); Tetsuo Nukui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 284 days.

(21) Appl. No.: 18/307,813

(22) Filed: Apr. 27, 2023

(65) Prior Publication Data

US 2024/0199357 A1 Jun. 20, 2024

(30) Foreign Application Priority Data

Dec. 16, 2022 (JP) ................................ 2022-201623

(51) Int. Cl.

| | |
|---|---|
| ***B65H 3/06*** | (2006.01) |
| ***B65H 3/00*** | (2006.01) |
| ***B65H 7/20*** | (2006.01) |
| ***G03G 15/00*** | (2006.01) |
| ***G03G 21/00*** | (2006.01) |

(52) U.S. Cl.

CPC ................ *B65H 3/06* (2013.01); *B65H 3/00* (2013.01); *B65H 7/20* (2013.01); *G03G 15/50* (2013.01); *G03G 21/00* (2013.01); *B65H 2301/531* (2013.01); *B65H 2405/111* (2013.01); *B65H 2551/20* (2013.01); *G03G 15/5016* (2013.01)

(58) Field of Classification Search

CPC ............... B65H 2301/531; B65H 3/06; B65H 2405/111

See application file for complete search history.

(56) References Cited

U.S. PATENT DOCUMENTS 8,777,215 B2 * 7/2014 Ohkura .................... B65H 1/12 271/157

FOREIGN PATENT DOCUMENTS

JP 2002193466 7/2002

* cited by examiner

*Primary Examiner* — Jeremy R Severson

(74) *Attorney, Agent, or Firm* — JCIPRNET

(57) ABSTRACT

A control device includes a processor configured to perform, in a feeding device including a feeding unit that feeds out a feeding target loaded on a loading unit and a cleaning unit that cleans the feeding unit in a state where the feeding target is exhausted from the loading unit, notification control of issuing notification to prompt a user to take out the feeding target from the loading unit on a notification unit in a case where an addition state in which the feeding target is added to the loading unit occurs before the feeding target is fed out and exhausted from the loading unit.

16 Claims, 12 Drawing Sheets

CONTROL DEVICE, NON-TRANSITORY COMPUTER READABLE MEDIUM STORING CONTROL PROGRAM, AND FEEDING DEVICE

CROSS-REFERENCE TO RELATED APPLICATIONS

This application is based on and claims priority under 35 USC 119 from Japanese Patent Application No. 2022-201623 filed Dec. 16, 2022.

BACKGROUND

(i) Technical Field

The present invention relates to a control device, a non-transitory computer readable medium storing a control program, and a feeding device.

(ii) Related Art

A paper feed unit is disclosed in JP2002-193466A, in the paper feed unit including a paper feed container that can be inserted into and removed from a body, a lift plate that guides paper contained in the paper feed container toward a paper feed position, and a pickup roller that sends out the paper guided by the lift plate to the paper feed position, in which the lift plate is provided with a frictional force recovering member that recovers frictional force on a pickup roller surface at a portion facing the pickup roller.

SUMMARY

An example of the feeding device may include a feeding device including a feeding unit that feeds out a feeding target loaded on a loading unit and a cleaning unit that cleans the feeding unit in a state where the feeding target is exhausted from the loading unit.

In the feeding device, in a case where the feeding target is added to the loading unit before the feeding target is exhausted from the loading unit, the cleaning unit may not be able to perform the cleaning of the feeding unit and thus the feeding unit may fail to feed.

Aspects of non-limiting embodiments of the present disclosure relate to a control device, a non-transitory computer readable medium storing a control program, and a feeding device that suppress, in a case where a feeding target is added to a loading unit before the feeding target is exhausted from the loading unit, a feeding failure of a feeding unit, as compared with a case where a processor does not execute notification control of a notification unit.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a control device including a processor configured to perform, in a feeding device including a feeding unit that feeds out a feeding target loaded on a loading unit and a cleaning unit that cleans the feeding unit in a state where the feeding target is exhausted from the loading unit, notification control of issuing notification to prompt a user to take out the feeding target from the loading unit on a notification unit in a case where an addition state in which the feeding target is added to the loading unit occurs before the feeding target is fed out and exhausted from the loading unit.

BRIEF DESCRIPTION OF THE DRAWINGS

Exemplary embodiment(s) of the present invention will be described in detail based on the following figures, wherein.

DETAILED DESCRIPTION

An example of an exemplary embodiment of the present invention will be described below with reference to drawings.

Image Forming Device 10

Figure 1:
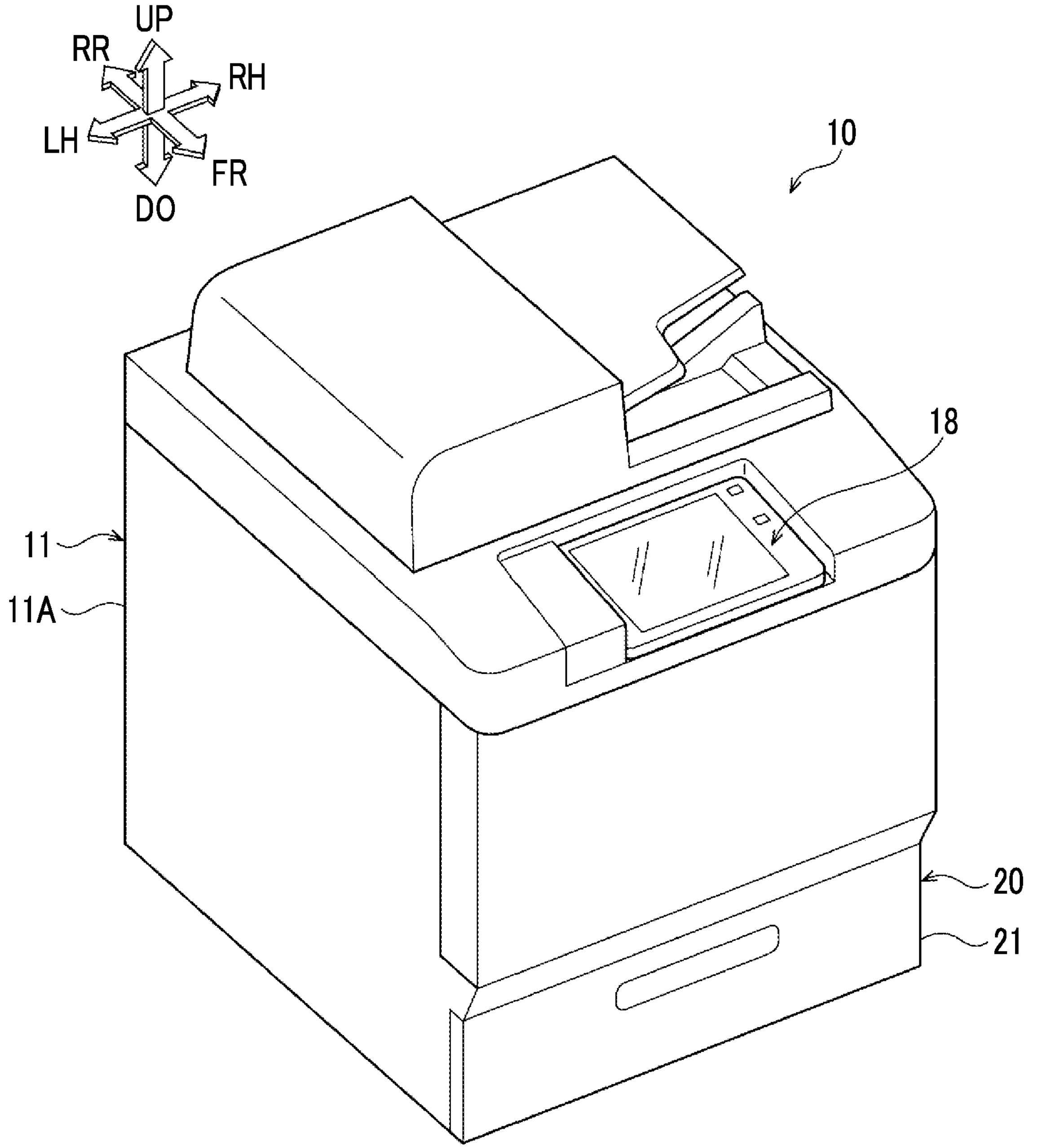
FIG. 1 is a perspective view of an image forming device according to the present exemplary embodiment.
Figure 2:
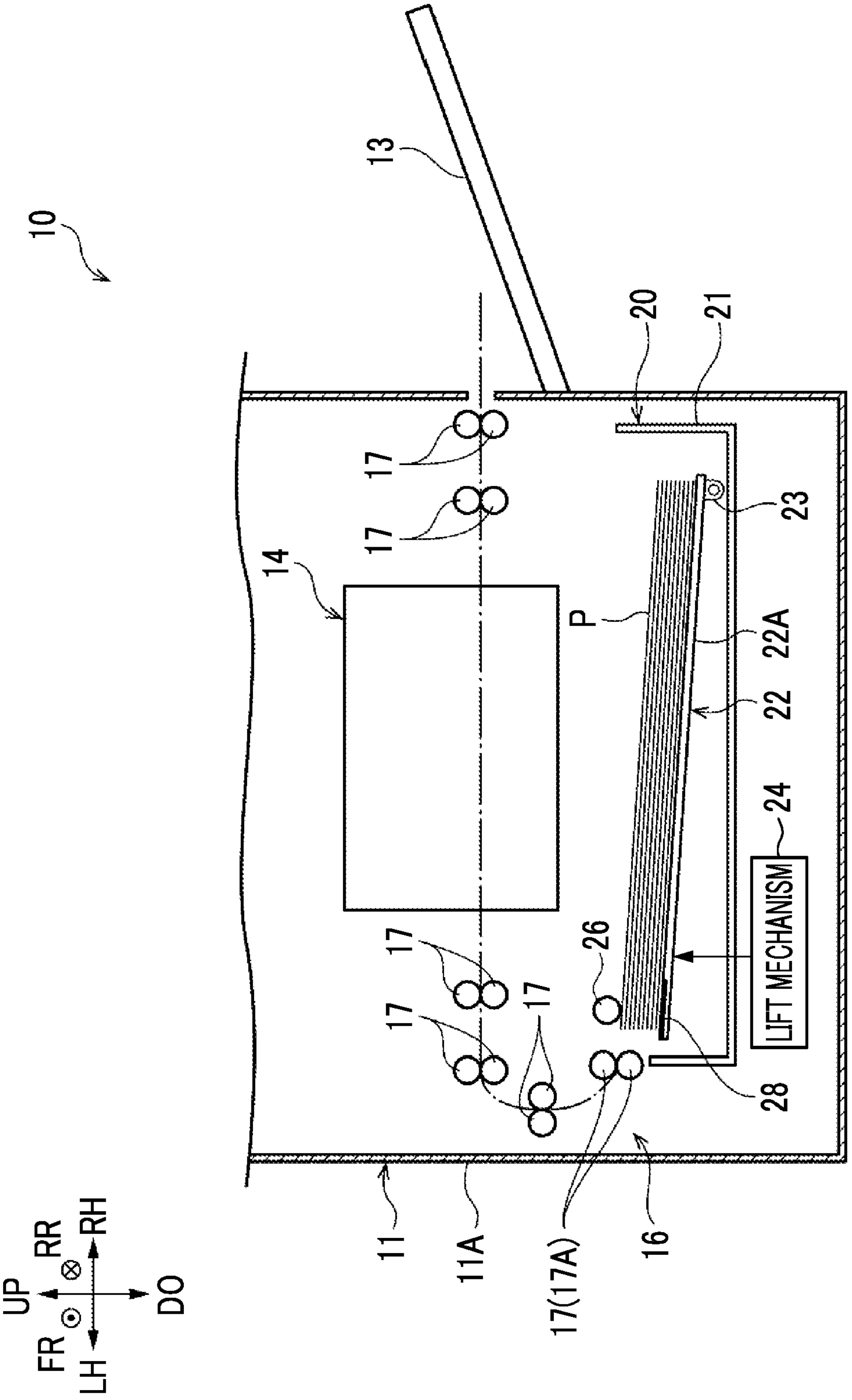
FIG. 2 is a front cross-sectional view of the image forming device according to the present exemplary embodiment.

First, a configuration of an image forming device 10 according to the present exemplary embodiment will be described. FIG. 1 is a perspective view of the image forming device 10. FIG. 2 is a front cross-sectional view of the image forming device 10.

An arrow UP shown in the figure indicates an upper side of the device, and an arrow DO indicates a lower side of the device. An arrow LH shown in the figure indicates a left side of the device, and an arrow RH indicates a right side of the device. An arrow FR shown in the figure indicates a front side of the device, and an arrow RR indicates a rear side of the device. These directions are set for convenience of description, and thus the device configuration is not limited to these directions. The term "device" may be omitted in each direction of the device. That is, for example, the term "upper side of device" may be simply referred to as "upper side".

In the following description, the term "up-and-down direction" may be used to mean "both upper side and lower side" or "any one of upper side or lower side". The term "right-left direction" may be used to mean "both right side and left side" or "any one of right side or left side". The term "right-left direction" can also be said to be a side, a lateral direction, and a horizontal direction. The term "front-and-rear direction" may be used to mean "both front side and rear side" or "any one of front side or rear side". The term "front-and-rear direction" can also be said to be a side, a lateral direction, and a horizontal direction. The up-and-down direction, the right-left direction, and the front-and-rear direction are directions intersecting each other (specifically, directions orthogonal to each other).

Further, a symbol in which "x" is described in "o" in the figure means an arrow from the front to the back of paper. Further, a symbol in which "." is described in "o" in the figure means an arrow from the back to the front of the paper. Further, dimensional ratios of parts shown in the respective figures in the up-and-down direction, the right-left direction, and the front-and-rear direction may differ from actual dimensional ratios.

The image forming device 10 shown in FIGS. 1 and 2 is to form an image. Specifically, the image forming device 10 includes an image forming device body 11, a display unit 18, and a feeding device 20, as shown in FIGS. 1 and 2. Further, the image forming device 10 includes a medium discharge unit 13, an image forming unit 14, and a transport mechanism 16, as shown in FIG. 2. Hereinafter, each part of the image forming device 10 will be described.

Image Forming Device Body 11

The image forming device body 11 shown in FIGS. 1 and 2 is a portion where each configuration unit of the image forming device 10 is provided. The image forming device body 11 has a housing 11A formed in a box shape.

In the present exemplary embodiment, for example, the feeding device 20, the image forming unit 14, and the transport mechanism 16 are provided inside the image forming device body 11, as shown in FIG. 2. As shown in FIG. 2, the medium discharge unit 13 is provided on a right side surface of the image forming device body 11.

Image Forming Unit 14

The image forming unit 14 shown in FIG. 2 has a function of forming an image on a recording medium P fed out from the feeding device 20. For example, an electrophotographic image forming unit that forms an image on the recording medium P using toner is used as the image forming unit 14.

In the electrophotographic image forming unit, for example, each step of charging, exposure, development, transfer, and fixing is performed to form an image on the recording medium P. As the electrophotographic image forming unit, each step of charging, exposure, development, and transfer may be performed to form an image on a transfer body, the image may be transferred from the transfer body to the recording medium P, and then the image may be fixed on the recording medium P to form an image on the recording medium P.

An example of the image forming unit is not limited to the electrophotographic image forming unit described above and may be, for example, an inkjet image forming unit, and various image forming units can be used. In the inkjet image forming unit, for example, an ink droplet is ejected from an ejection unit to the recording medium P to form an image on the recording medium P.

Transport Mechanism 16

The transport mechanism 16 shown in FIG. 2 is to transport the recording medium P. As an example, the transport mechanism 16 transports the recording medium P by a transport member 17 such as a transport roll. The transport member 17 may be a transport belt or the like, and may be any member as long as the transport member can apply transport force to the recording medium P to transport the recording medium P.

In the present exemplary embodiment, the transport mechanism 16 transports, to the image forming unit 14, the recording medium P fed out from the feeding device 20. Further, the transport mechanism 16 transports the recording medium P from the image forming unit 14 to the medium discharge unit 13. A specific configuration of the feeding device 20 will be described below.

Medium Discharge Unit 13

The medium discharge unit 13 shown in FIG. 2 is a portion where the recording medium P is discharged, in the image forming device 10. In the medium discharge unit 13, the recording medium P on which the image is formed by the image forming unit 14 is discharged.

Display Unit 18

The display unit 18 is an example of a notification unit and displays presentation information to be presented to a user to notify the user of the presentation information. The display unit 18 is configured of, for example, a liquid crystal display or an organic electro-luminescence (EL) display.

In the present exemplary embodiment, the display unit 18 is disposed on a front side of an upper surface of the image forming device body 11. Therefore, for example, the display unit 18 is visually recognized by a user located on the front side with respect to the image forming device body 11.

The display unit 18 may include an input unit that receives an instruction from the user. In this case, the input unit is configured of, for example, a touch panel of a resistance film type, a capacitance type, or the like, and receives the instruction from the user by a contact operation of the user.

Feeding Device 20 According to First Exemplary Embodiment

Figure 3:
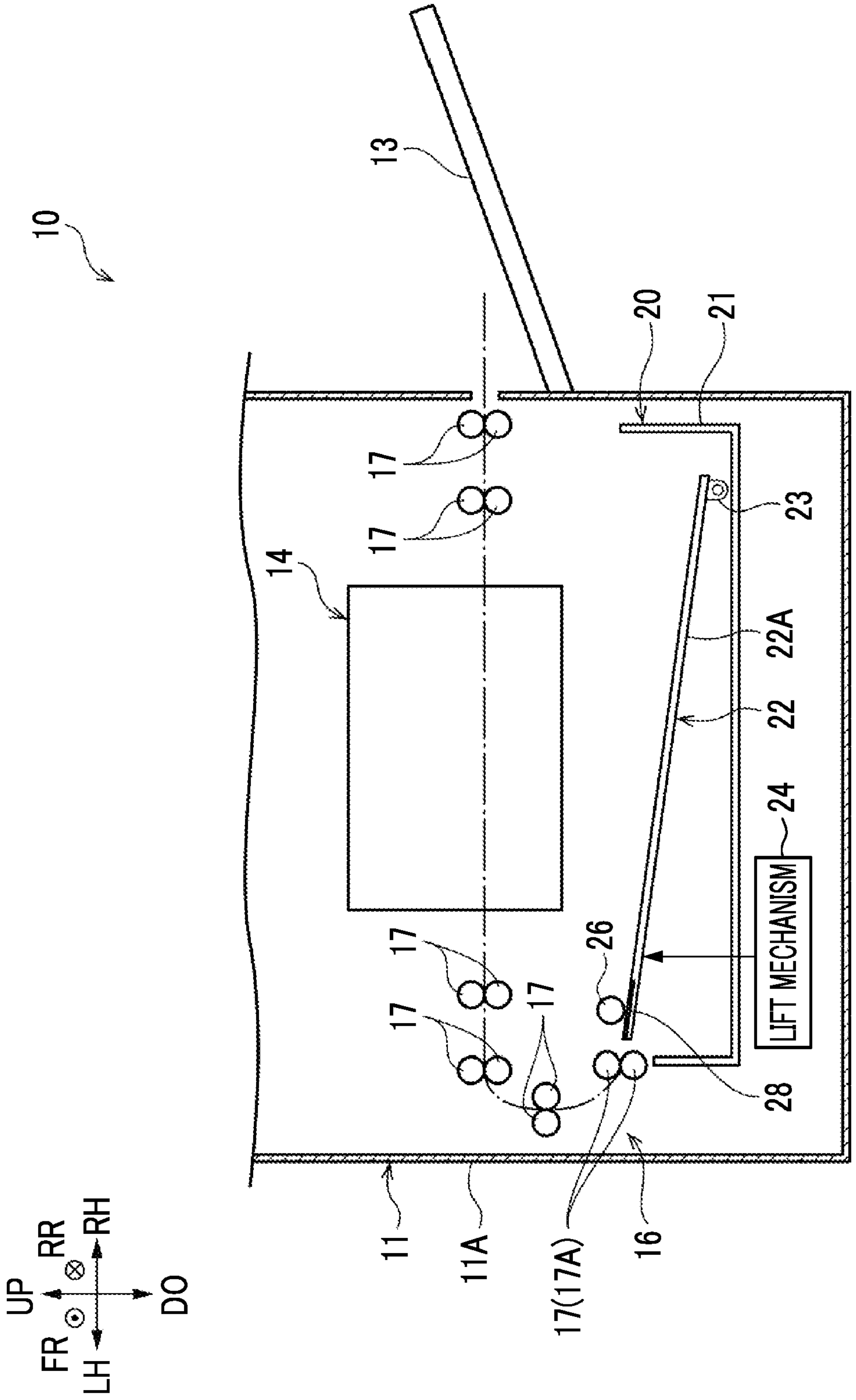
FIG. 3 is a front cross-sectional view of a state in which a feeding roll is cleaned in the image forming device according to the present exemplary embodiment.

FIGS. 2 and 3 show a schematic diagram of the feeding device 20. Further, FIG. 4 shows a block diagram showing an example of a hardware configuration of the feeding device 20.

Figure 4:
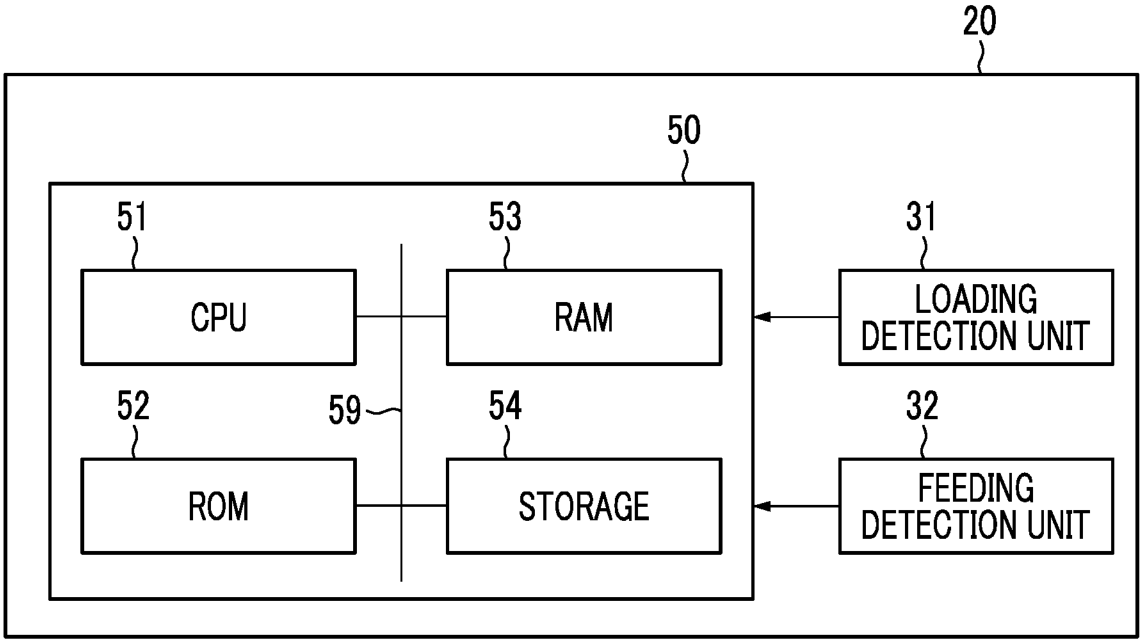
FIG. 4 is a block diagram showing an example of a hardware configuration of a feeding device according to a first exemplary embodiment.

The feeding device 20 shown in FIGS. 2, 3, and 4 feeds out the recording medium P. The recording medium P is an example of a feeding target. As shown in FIGS. 2 and 3, the feeding device 20 includes a feeding device body 21, a loading unit 22, a lift mechanism 24, a feeding roll 26, and a cleaning pad 28. Further, as shown in FIG. 4, the feeding device 20 includes a loading detection unit 31, a feeding detection unit 32, and a control device 50.

The feeding device body 21 is a configuration unit in which the recording medium P is contained. The feeding device body 21 is configured of, for example, a housing having an opening on an upper side. In the present exemplary embodiment, the feeding device body 21 is attached to the image forming device body 11 to be able to be pulled out to the front side.

The feeding device body 21 contains the recording medium P from the upper side in a state of being pulled out from the image forming device body 11. The feeding device body 21 pulled out from the image forming device body 11 is moved to the rear side to be mounted to the image forming device body 11.

The loading unit 22 is a configuration unit on which the recording medium P is loaded, and is provided inside the feeding device body 21. Therefore, in a case where the feeding device body 21 is pulled out, the loading unit 22 is pulled out together with the feeding device body 21. The loading unit 22 has a plate-shaped loading member 22A whose upper surface is loaded with the recording medium P. In the present exemplary embodiment, one end portion (specifically, right end portion) of the loading member 22A is rotatably supported by a support part 23. In the loading unit 22, the other end portion (specifically, left end portion) of the loading member 22A can move up and down in the up-and-down direction with one end portion of the loading member 22A as a fulcrum.

The loading member 22A may be configured to be able to move up and down in a state where the upper surface thereof is along the horizontal direction.

The lift mechanism 24 is to move up and down the loading unit 22 (specifically, loading member 22A).

The lift mechanism 24 moves up the loading unit 22 to a contact position where the highest recording medium P loaded on the loading unit 22 comes into contact with the feeding roll 26. Further, in a case where the feeding device body 21 is pulled out from the image forming device body 11, the lift mechanism 24 moves down the loading unit 22. Examples of the lift mechanism 24 can include a mechanism using a rack and a pinion and a mechanism using an elastic body, such as a compression spring, and another mechanical element.

The feeding roll 26 is an example of a feeding unit and is to feed the recording medium P loaded on the loading unit 22. Specifically, the feeding roll 26 rotates in a state of being in contact with the upper surface of the highest recording medium P among recording media P loaded on the loading unit 22 to feed the recording medium P toward the image forming unit 14.

An example of the feeding unit may include a feeding belt or the like, and any configuration unit that feeds out the recording medium P may be used.

The cleaning pad 28 is an example of a cleaning unit and is to clean the feeding roll 26. The cleaning pad 28 is provided, for example, on the loading unit 22 (specifically, upper surface of loading member 22A). In a state where the recording medium P is not loaded on the loading unit 22, the cleaning pad 28 comes into contact with the feeding roll 26, and the feeding roll 26 rotates in this state to clean an outer peripheral surface of the feeding roll 26. The cleaning pad 28 is made of, for example, a rubber material, cork, felt, or the like.

An example of the cleaning unit may include a cleaning brush or the like, and any configuration unit may be used as long as the unit cleans the feeding unit such as the feeding roll 26.

The loading detection unit 31 is a configuration unit that detects whether or not the recording medium P is loaded on the loading unit 22.

The loading detection unit 31 is configured of, for example, a detection sensor that detects the recording medium P loaded on the loading unit 22. An example of the detection sensor includes a non-contact type sensor such as a transmission type or a reflection type optical sensor. The detection sensor may be, for example, a contact-type sensor that contacts a recording medium P loaded on the loading unit 22 to detect the recording medium P, and various sensors can be used.

For example, in a case where the recording medium P loaded on the loading unit 22 is detected, the loading detection unit 31 transmits, to the control device 50, loading information (that is, loading signal) indicating that the recording medium P is loaded on the loading unit 22.

The feeding detection unit 32 is a configuration unit that detects the feeding of the recording medium P from the feeding device 20. The feeding detection unit 32 is disposed, for example, on a side downstream of the feeding roll 26 in a transport direction, which is on a side upstream of a transport member 17A in the transport direction, and detects the recording medium P passing through this position. The transport member 17A is a transport member 17, among the transport members 17, which is disposed at the closest position on the side downstream of the feeding roll 26 in the transport direction.

In the present exemplary embodiment, the feeding detection unit 32 is configured of, for example, a detection sensor that detects the recording medium P fed out from the feeding device 20. An example of the detection sensor includes a non-contact type sensor such as a transmission type or a reflection type optical sensor. The detection sensor may be, for example, a contact-type sensor that contacts a recording medium P fed out from the feeding device 20 to detect the recording medium P, and various sensors can be used.

For example, in a case where the recording medium P fed out from the feeding device 20 is detected, the feeding detection unit 32 transmits, to the control device 50, feeding information (that is, feeding signal) indicating that the recording medium P is fed out from the feeding device 20. Therefore, in the present exemplary embodiment, the feeding information is transmitted to the control device 50 each time the recording medium P is fed out from the feeding device 20.

Control Device 50

The control device 50 shown in FIG. 4 is to control each part including the display unit 18, the lift mechanism 24, and the feeding roll 26. Specifically, the control device 50 has a function as a computer and includes a central processing unit (CPU) 51, a read only memory (ROM) 52, a random access memory (RAM) 53, and a storage 54, as shown in FIG. 4.

Each of the CPU 51, the ROM 52, the RAM 53, and the storage 54 is connected to each other by a bus 59. The CPU 51 manages and controls the entire control device 50. The ROM 52 stores various programs including a control program, various types of data, and the like, which are used in the present exemplary embodiment. The RAM 53 is a memory used as a work area at the time of executing various programs. The CPU 51 expands the program stored in the ROM 52 into the RAM 53 and executes the program to perform various pieces of processing. The control program is an example of an execution program.

As an example, the storage 54 is configured of a hard disk drive (HDD), a solid state drive (SSD), a flash memory, or the like, and stores various programs, various pieces of data, and the like. The control program may be stored in the storage 54.

In the control device 50, the CPU 51 executes the control program to control each part including the display unit 18 as follows. That is, in a case where the recording medium P is exhausted from the loading unit 22, the CPU 51 performs, on the feeding roll 26 and the lift mechanism 24, control (hereinafter referred to as cleaning control) of executing a cleaning operation for cleaning the feeding roll 26 by the cleaning pad 28.

Further, in a case where a state occurs in which the recording medium P is added to the loading unit 22 (hereinafter referred to as addition state) before the recording medium P is fed out and exhausted from the loading unit 22, the CPU 51 performs, on the display unit 18, control (hereinafter referred to as display control) of performing a display to prompt the user to take out the recording medium P from the loading unit 22.

In the present exemplary embodiment, the CPU 51 performs the display control on the display unit 18 in a case where the recording media P larger in number than the number of maximum loadings of the loading unit 22 are fed out while a state is maintained in which the recording medium P is loaded on the loading unit 22, as a case where the addition state occurs.

Specifically, the CPU 51 performs the display control on the display unit 18 in a case where the recording media P larger in number than the number of maximum loadings of the loading unit 22 are fed out without the feeding rolls 26 being cleaned by the cleaning pad 28, as a case where the addition state occurs.

Further, in a case where the display control is performed on the display unit 18 and then the recording medium P is exhausted from the loading unit 22, the CPU 51 performs, on the display unit 18, end control of ending the display related to the display control.

Specifically, in a case where the display control is performed on the display unit 18 and then the feeding roll 26 is cleaned by the cleaning pad 28, the CPU 51 performs, on the display unit 18, the end control of ending the display related to the display control.

Figure 5:
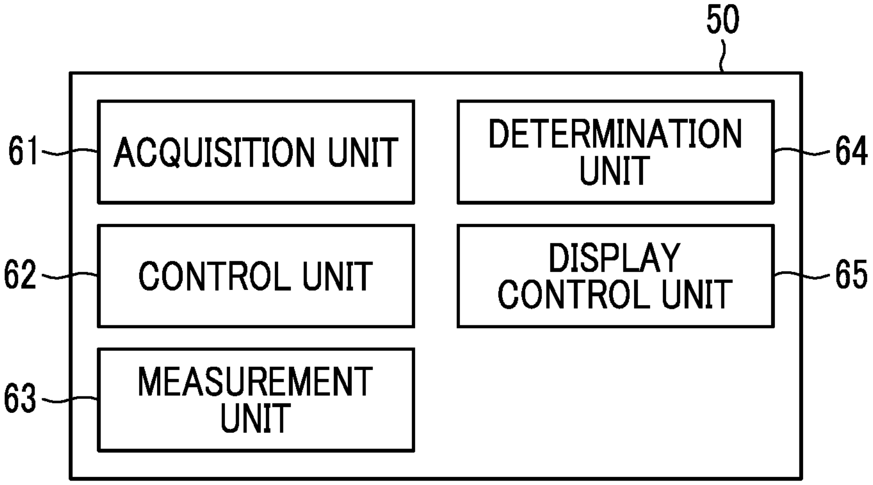
FIG. 5 is a block diagram showing an example of a functional configuration of a control device according to the first exemplary embodiment.

In the present exemplary embodiment, the CPU 51 executes the control program in the control device 50 to realize various functions of controlling the display unit 18. Hereinafter, a functional configuration realized by cooperation between the CPU 51 as a hardware resource and the control program as a software resource will be described. FIG. 5 is a block diagram showing an example of the functional configuration of the control device 50 according to the present exemplary embodiment.

As an example, the control device 50 includes an acquisition unit 61, a control unit 62, a measurement unit 63, a determination unit 64, and a display control unit 65, as shown in FIG. 5.

The acquisition unit 61 acquires, from the loading detection unit 31, the loading information indicating that the recording medium P is loaded on the loading unit 22. Further, the acquisition unit 61 acquires, from the feeding detection unit 32, the feeding information indicating that the recording medium P is fed out from the feeding device 20.

In a case where the recording medium P is exhausted from the loading unit 22 (specifically, in a case where the loading information is no longer acquired from a state where the acquisition unit 61 has acquired the loading information), the control unit 62 performs, on the feeding roll 26 and the lift mechanism 24, the cleaning control of executing the cleaning operation for cleaning the feeding roll 26 by the cleaning pad 28.

The cleaning operation in the lift mechanism 24 is an operation in which the lift mechanism 24 moves up the loading unit 22 to a position where the cleaning pad 28 comes into contact with the feeding roll 26. The cleaning operation of the feeding roll 26 is an operation in which the feeding roll 26 rotates in a state where the cleaning pad 28 is in contact with the feeding roll 26.

The measurement unit 63 measures the number of times of feeding of the recording medium P fed out from the loading unit 22. Specifically, the measurement unit 63 measures the number of times the acquisition unit 61 acquires the feeding information. In a case where the recording medium P is exhausted from the loading unit 22 (specifically, in a case where the loading information is no longer acquired from a state where the acquisition unit 61 has acquired the loading information), the measurement unit 63 resets the measured number of times of feeding to zero and restarts the measurement from zero. In the present exemplary embodiment, in a case where the control unit 62 executes the cleaning control, the measurement unit 63 resets the measured number of times of feeding to zero and restarts the measurement from zero.

The determination unit 64 determines whether or not the number of times measured by the measurement unit 63 (specifically, the number of times of acquisition) exceeds the number of maximum loadings of the loading unit 22. Information on the number of maximum loadings is stored in advance in the storage 54, and the determination unit 64 refers to the information.

In a case where the determination unit 64 determines that the number of times of feeding measured by the measurement unit 63 exceeds the number of maximum loadings of the loading unit 22, the display control unit 65 performs the display control on the display unit 18. Specifically, for the display related to the display control, for example, a message such as "Please take out all the recording media P loaded on the loading unit 22 in order to clean the feeding roll 26" is displayed on the display unit 18.

In a case where the display control is performed on the display unit 18 and then the recording medium P is exhausted from the loading unit 22 (specifically, in a case where the loading information is no longer acquired from a state where the acquisition unit 61 has acquired the loading information), the display control unit 65 performs, on the display unit 18, control (hereinafter referred to as end control) of ending the display related to the display control.

In the present exemplary embodiment, in a case where the display control is performed on the display unit 18 and then the control unit 62 executes the cleaning control, the display control unit 65 performs the end control on the display unit 18.

Control Processing According to Present Exemplary Embodiment

Figure 6:
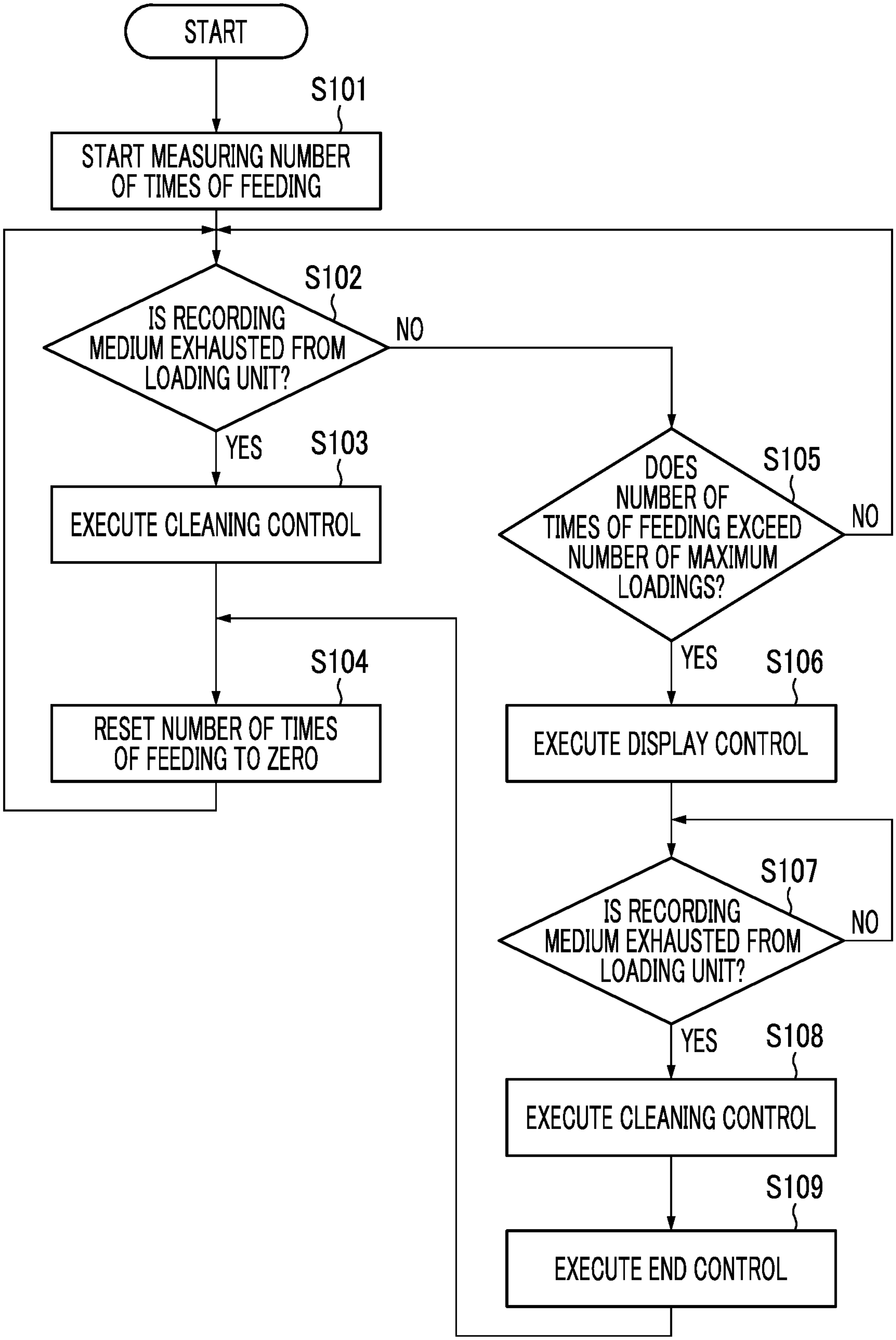
FIG. 6 is a flowchart showing an example of a flow of control processing executed by the control device according to the first exemplary embodiment.

Next, an example of control processing according to the present exemplary embodiment will be described. FIG. 6 is a flowchart showing an example of a flow of the control processing executed by the control device 50.

In the present exemplary embodiment, the CPU 51 reads out the control program from the ROM 52 or the storage 54 and executes the control program to execute the present control processing. As an example, execution of the present control processing is started in a case where the image forming device 10 including the feeding device 20 starts operating (that is, in a case where power of the image forming device 10 is turned on).

As shown in FIG. 6, in a case where the present control processing is started, the CPU 51 starts measuring the number of times of feeding of the recording medium P fed out from the loading unit 22 (step S101). The CPU 51 measures (that is, adds up) the number of times of feeding of the recording medium P each time the recording medium P is fed out from the loading unit 22.

Next, the CPU 51 determines whether or not the recording medium P is exhausted from the loading unit 22 (step S102).

In a case where the recording medium P is determined to be exhausted from the loading unit 22 (YES in step S102), the CPU 51 performs, on the feeding roll 26 and the lift mechanism 24, the cleaning control of executing the cleaning operation (step S103), resets the measured number of times of feeding to zero (step S104), and returns the processing to step S102.

On the other hand, in a case where the state is determined to be maintained in which the recording medium P is loaded on the loading unit 22 (NO in step S102), the CPU 51 determines whether or not the measured number of times of feeding exceeds the number of maximum loadings of the loading unit 22 (step S105).

In a case where the measured number of times of feeding is determined to be equal to or less than the number of maximum loadings of the loading unit 22 (NO in step S105), the CPU 51 returns the processing to step S102. In this case, the measured number of times of feeding is not reset to zero.

On the other hand, in a case where the measured number of times of feeding is determined to exceed the number of maximum loadings of the loading unit 22 (YES in step S105), the CPU 51 performs the display control on the display unit 18 (step S106). Specifically, for the display related to the display control, for example, a message such as "Please take out all the recording media P loaded on the loading unit 22 in order to clean the feeding roll 26" is displayed on the display unit 18. In a case where an operation of forming an image is being performed (that is, operation of feeding the recording medium P is being performed), the display may be performed after the operation ends.

Next, the CPU 51 determines whether or not the recording medium P is exhausted from the loading unit 22 (step S107).

In a case where the recording medium P is determined to be exhausted from the loading unit 22 (YES in step S107), the CPU 51 performs, on the feeding roll 26 and the lift mechanism 24, the cleaning control of executing the cleaning operation (step S108) and performs, on the display unit 18, the end control of ending the display related to the display control in step S106 (step S109), and the processing proceeds to step S104. In the present control processing, step S108 may be executed after step S109.

On the other hand, in a case where the state is determined to be maintained in which the recording medium P is loaded on the loading unit 22 (NO in step S107), the CPU 51 repeats step S107 until the recording medium P is determined to be exhausted from the loading unit 22.

In the present control processing, in a case where the operation of the image forming device 10 is stopped (that is, in a case where the power of the image forming device 10 is turned off), the present control processing ends regardless of which step is being executed.

Action According to Present Exemplary Embodiment

In a case where the addition state occurs in which the recording medium P is added to the loading unit 22 before the recording medium P is fed out and exhausted from the loading unit 22, the CPU 51 performs, on the display unit 18, the display control of performing the display to prompt the user to take out the recording medium P from the loading unit 22.

In a case where the user takes out the recording medium P from the loading unit 22 based on this display, in the present exemplary embodiment, the feeding roll 26 and the lift mechanism 24 execute the cleaning operation of cleaning the feeding roll 26.

Therefore, according to the present exemplary embodiment, in a case where the recording medium P is added to the loading unit 22 before the recording medium P is exhausted from the loading unit 22, a feeding failure of the feeding roll 26 is suppressed as compared with a case where the CPU 51 does not execute the display control on the display unit 18.

In the present exemplary embodiment, the CPU 51 performs the display control on the display unit 18 in a case where the recording media P larger in number than the number of maximum loadings of the loading unit 22 are fed out while the state is maintained in which the recording medium P is loaded on the loading unit 22, as a case where the addition state occurs.

In a case where the user takes out the recording medium P from the loading unit 22 based on this display, in the present exemplary embodiment, the feeding roll 26 and the lift mechanism 24 execute the cleaning operation of cleaning the feeding roll 26.

Therefore, according to the present exemplary embodiment, in a case where the recording media P larger in number than the number of maximum loadings of the loading unit 22 are fed out while the state is maintained in which the recording medium P is loaded on the loading unit 22, the feeding failure of the feeding roll 26 is suppressed as compared with a case where the CPU 51 does not execute the display control on the display unit 18.

Specifically, the CPU 51 performs the display control on the display unit 18 in a case where the recording media P larger in number than the number of maximum loadings of the loading unit 22 are fed out without the feeding rolls 26 being cleaned by the cleaning pad 28, as a case where the addition state occurs.

In a case where the user takes out the recording medium P from the loading unit 22 based on this display, in the present exemplary embodiment, the feeding roll 26 and the lift mechanism 24 execute the cleaning operation of cleaning the feeding roll 26.

Therefore, according to the present exemplary embodiment, in a case where the recording media P larger in number than the number of maximum loadings of the loading unit 22 are fed out without the feeding rolls 26 being cleaned by the cleaning pad 28, the feeding failure of the feeding roll 26 is suppressed as compared with a case where the CPU 51 does not execute the display control on the display unit 18.

Further, in a case where the display control is performed on the display unit 18 and then the recording medium P is exhausted from the loading unit 22, the CPU 51 performs, on the display unit 18, the end control of ending the display related to the display control. Accordingly, the user is made to recognize that the taking out of the recording medium P related to the display by the display unit 18 is executed.

Specifically, in a case where the display control is performed on the display unit 18 and then the feeding roll 26 is cleaned by the cleaning pad 28, the CPU 51 performs, on the display unit 18, the end control of ending the display related to the display control. Accordingly, the user is made to recognize that the taking out of the recording medium P related to the display by the display unit 18 is executed.

First Modification Example

In the present exemplary embodiment, the CPU 51 performs only the display control on the display unit 18 in a case where the addition state occurs, but the present invention is not limited thereto. For example, the CPU 51 may perform the display control on the display unit 18 and may perform, on the feeding roll 26, prohibition control of prohibiting the feeding operation of the recording medium P in a case where the addition state occurs (refer to FIG. 7).

Further, in a case where the display control is performed on the display unit 18 and the prohibition control is performed on the feeding roll 26, and then the recording medium P is exhausted from the loading unit 22, the CPU 51 may perform the end control of ending the display related to the display control on the display unit 18 and release control of releasing the prohibition of the feeding operation of the recording medium P on the feeding roll 26.

Specifically, for example, in a case where the display control is performed on the display unit 18 and then the feeding roll 26 is cleaned by the cleaning pad 28, the CPU 51 performs the end control of ending the display related to the display control on the display unit 18 and the release control of releasing the prohibition of the feeding operation of the recording medium P on the feeding roll 26.

Figure 7:
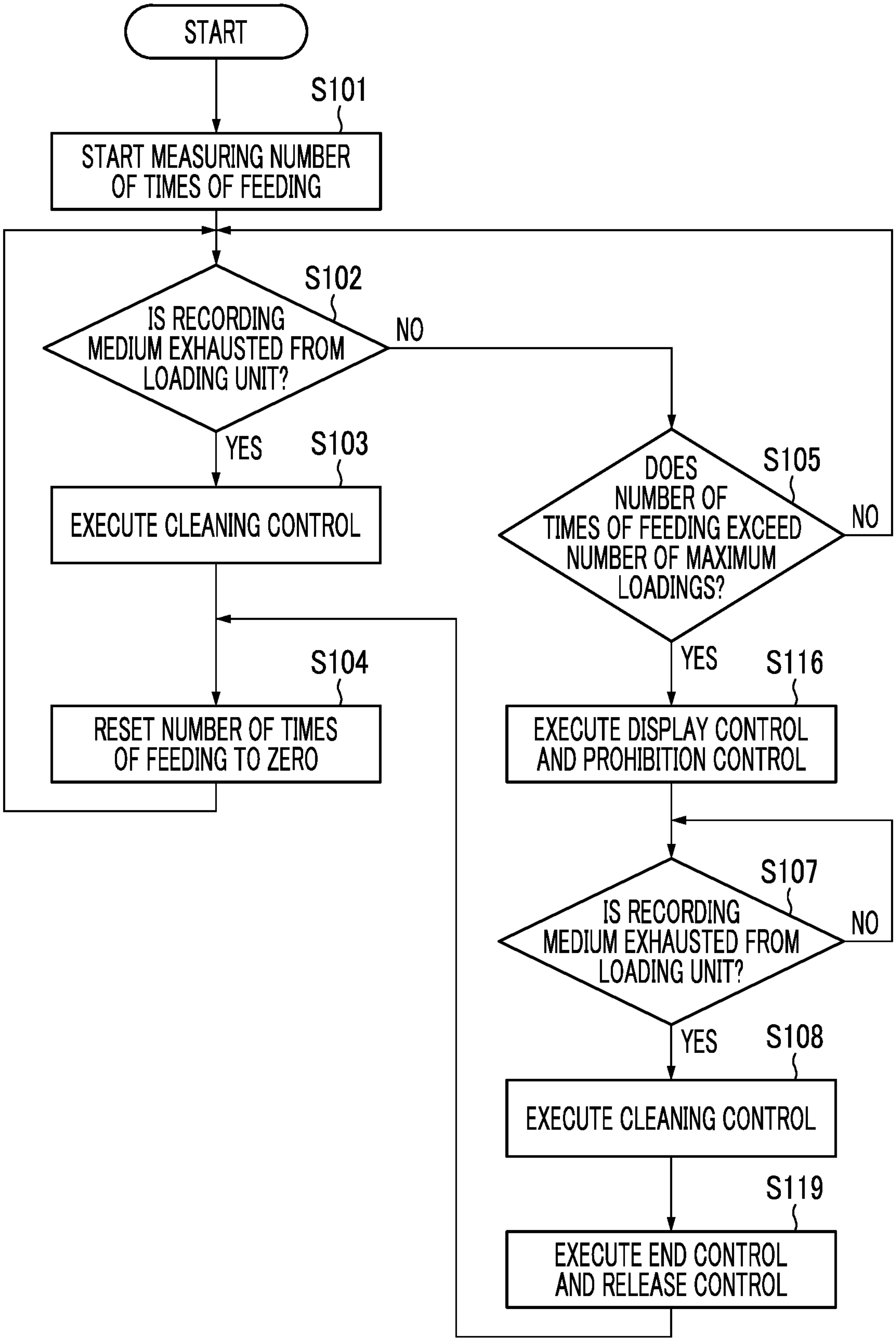
FIG. 7 is a flowchart showing an example of a flow of control processing according to a first modification example of the first exemplary embodiment.

Specifically, in the first modification example, for example, the control processing is executed, as shown in FIG. 7. In FIG. 7, the identical reference numerals are assigned to the identical parts as the control processing shown in FIG. 6, and the description thereof will be omitted as appropriate below.

In a case where the measured number of times of feeding is determined to exceed the number of maximum loadings of the loading unit 22 (YES in step S105), the CPU 51 performs the display control on the display unit 18 and performs, on the feeding roll 26, the prohibition control of prohibiting the feeding operation of the recording medium P (step S116).

Specifically, for the display related to the display control, for example, a message such as "Please take out all the recording media P loaded on the loading unit 22 in order to clean the feeding roll 26" is displayed on the display unit 18. The prohibition of the feeding operation related to the prohibition control is executed by stopping a drive source that drives the feeding roll 26. In a case where an operation of forming an image is being performed (that is, operation of feeding the recording medium P is being performed), the display and the prohibition may be performed after the operation ends.

In a case where the recording medium P is determined to be exhausted from the loading unit 22 (YES in step S107), the CPU 51 performs the cleaning control of executing the cleaning operation on the feeding roll 26 and the lift mechanism 24 (step S108) and performs the end control of ending the display related to the display control in step S106 on the display unit 18 and the release control of releasing the prohibition of the feeding operation of the recording medium P on the feeding roll 26 (step S119), and the processing proceeds to step S104. In the present control processing, step S108 may be executed after step S119.

Action of First Modification Example

In a case where the addition state occurs, the CPU 51 performs the display control on the display unit 18 and performs, on the feeding roll 26, the prohibition control of prohibiting the feeding operation of the recording medium P.

Accordingly, since the user is forced to take out the recording medium P from the loading unit 22, the feeding failure of the feeding roll 26 is suppressed as compared with a case where the CPU 51 performs only the display control on the display unit 18 in a case where the addition state occurs.

Further, in a case where the display control is performed on the display unit 18 and the prohibition control is performed on the feeding roll 26, and then the recording medium P is exhausted from the loading unit 22, the CPU 51 performs the end control of ending the display related to the display control on the display unit 18 and the release control of releasing the prohibition of the feeding operation of the recording medium P on the feeding roll 26. Accordingly, the user is made to recognize that the taking out of the recording medium P related to the display by the display unit 18 is executed.

Specifically, for example, in a case where the display control is performed on the display unit 18 and then the feeding roll 26 is cleaned by the cleaning pad 28, the CPU 51 performs the end control of ending the display related to the display control on the display unit 18 and the release control of releasing the prohibition of the feeding operation of the recording medium P on the feeding roll 26. Accordingly, the user is made to recognize that the taking out of the recording medium P related to the display by the display unit 18 is executed.

Second Modification Example

In the present exemplary embodiment, the CPU 51 performs only the display control on the display unit 18 in a case where the addition state occurs, but the present invention is not limited thereto. For example, in a case where the display control is performed on the display unit 18 and then the state further occurs in which the recording medium P is added to the loading unit 22, the CPU 51 may perform, on the feeding roll 26, the prohibition control of prohibiting the feeding operation of the recording medium P in addition to the execution of the display control on the display unit 18 (refer to FIG. 8).

Further, in a case where the prohibition control of prohibiting the feeding operation of the recording medium P is performed on the feeding roll 26 in addition to the execution of the display control on the display unit 18 and then the recording medium P is exhausted from the loading unit 22, the CPU 51 may perform the end control of ending the display related to the display control on the display unit 18 and the release control of releasing the prohibition of the feeding operation of the recording medium P on the feeding roll 26.

Specifically, for example, in a case where the prohibition control of prohibiting the feeding operation of the recording medium P is performed on the feeding roll 26 in addition to the execution of the display control on the display unit 18 and then the feeding roll 26 is cleaned by the cleaning pad 28, the CPU 51 performs the end control of ending the display related to the display control on the display unit 18 and the release control of releasing the prohibition of the feeding operation of the recording medium P on the feeding roll 26.

Figure 8:
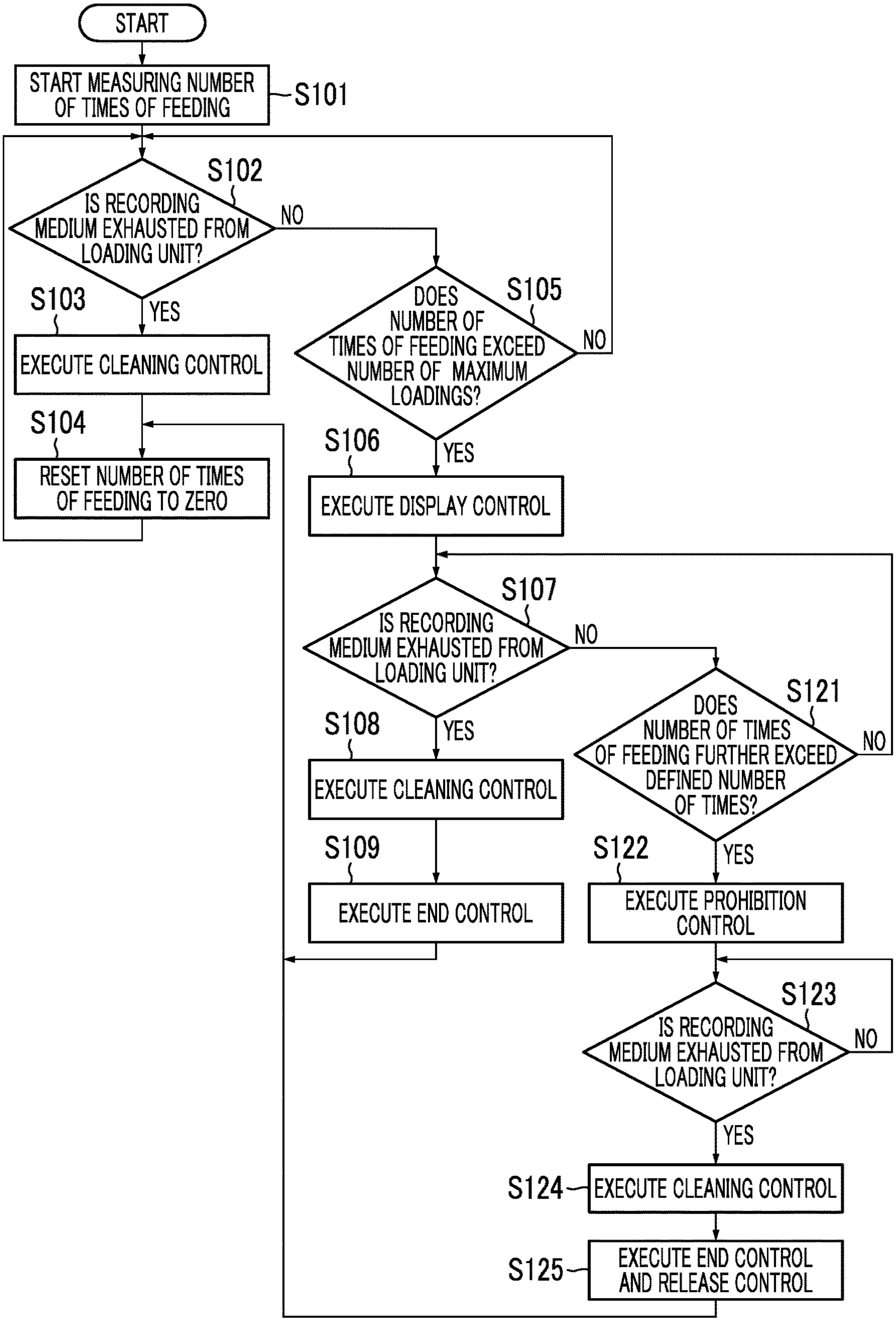
FIG. 8 is a flowchart showing an example of a flow of control processing according to a second modification example of the first exemplary embodiment.

Specifically, in the second modification example, for example, the control processing is executed, as shown in FIG. 8. In FIG. 8, the identical reference numerals are assigned to the identical parts as the control processing shown in FIG. 6, and the description thereof will be omitted as appropriate below.

In step S107, in a case where the state is determined to be maintained in which the recording medium P is loaded on the loading unit 22 (NO in step S107), the CPU 51 determines whether or not the measured number of times of feeding further exceeds the defined number of times (step S121). The defined number of times is the number of times set in advance as a number exceeding the number of maximum loadings.

In a case where the measured number of times of feeding is determined to be equal to or less than the defined number of times (NO in step S121), the CPU 51 returns the processing to step S107. In this case, the measured number of times of feeding is not reset to zero.

On the other hand, in a case where the measured number of times of feeding is determined to exceed the defined number of times (YES in step S121), the CPU 51 performs, on the feeding roll 26, the prohibition control of prohibiting the feeding operation of the recording medium P (step S122). The prohibition of the feeding operation related to the prohibition control is executed by stopping a drive source that drives the feeding roll 26.

Next, the CPU 51 determines whether or not the recording medium P is exhausted from the loading unit 22 (step S123).

In a case where the recording medium P is determined to be exhausted from the loading unit 22 (YES in step S123), the CPU 51 performs the cleaning control of executing the cleaning operation on the feeding roll 26 and the lift mechanism 24 (step S124) and performs the end control of ending the display related to the display control on the display unit 18 and the release control of releasing the prohibition of the feeding operation of the recording medium P on the feeding roll 26 (step S125), and the processing proceeds to step S104.

On the other hand, in a case where the state is determined to be maintained in which the recording medium P is loaded on the loading unit 22 (NO in step S123), the CPU 51 repeats step S123 until the recording medium P is determined to be exhausted from the loading unit 22.

Action of Second Modification Example

In a case where the display control is performed on the display unit 18 and then the state further occurs in which the recording medium P is added to the loading unit 22, the CPU 51 performs, on the feeding roll 26, the prohibition control of prohibiting the feeding operation of the recording medium P in addition to the execution of the display control on the display unit 18.

Accordingly, since the user is forced to take out the recording medium P from the loading unit 22, in a case where the display control is performed on the display unit 18 and then the state further occurs in which the recording medium P is added to the loading unit 22, the feeding failure of the feeding roll 26 is suppressed as compared with a case where the CPU 51 performs only the display control on the display unit 18.

Further, in the present modification example, in a case where the prohibition control of prohibiting the feeding operation of the recording medium P is performed on the feeding roll 26 in addition to the execution of the display control on the display unit 18 and then the recording medium P is exhausted from the loading unit 22, the CPU 51 performs the end control of ending the display related to the display control on the display unit 18 and the release control of releasing the prohibition of the feeding operation of the recording medium P on the feeding roll 26. Accordingly, the user is made to recognize that the taking out of the recording medium P related to the display by the display unit 18 is executed.

Specifically, for example, in a case where the prohibition control of prohibiting the feeding operation of the recording medium P is performed on the feeding roll 26 in addition to the execution of the display control on the display unit 18 and then the feeding roll 26 is cleaned by the cleaning pad 28, the CPU 51 performs, on the display unit 18, the end control of ending the display related to the display control and performs, on the feeding roll 26, the release control of releasing the prohibition of the feeding operation of the recording medium P. Accordingly, the user is made to recognize that the taking out of the recording medium P related to the display by the display unit 18 is executed.

Other Modification Examples

In the present exemplary embodiment, the recording medium P is used as an example of the feeding target, but the present invention is not limited thereto.

An example of the feeding target may include a document in which an image can be read, and any target that can be fed out may be used.

Therefore, an example of the feeding device is not limited to a device that feeds out the recording medium P and may include any device that feeds out a document or the like, and various devices can be used. Further, the image forming device 10 may be grasped as an example of the feeding device. Further, in a case where a document is fed out, an image reading device having an image reading unit, such as a scanner that reads an image of the document, may be grasped as an example of the feeding device.

In the present exemplary embodiment, the display is performed by the display unit 18 as an example of the notification, but the present invention is not limited thereto. An example of the notification may include a display by a user terminal (an example of a notification unit). Examples of the user terminal include a user-owned smartphone, tablet, and personal computer. In this case, the notification using e-mail or the like is possible. Further, an example of the notification may include a notification by voice emitted from a speaker (an example of a notification unit).

In the present exemplary embodiment, in a case where the display control is performed on the display unit 18 and then the recording medium P is exhausted from the loading unit 22, the CPU 51 performs, on the display unit 18, the end control of ending the display related to the display control. However, the present invention is not limited thereto. In a case where the display control is performed on the display unit 18 and then the recording medium P is exhausted from the loading unit 22, the CPU 51 may be configured not to perform the end control. In this case, for example, the display related to the display control is ended by, for example, the user performing an operation of ending the display.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Feeding Device 220 According to Second Exemplary Embodiment

Figure 9:
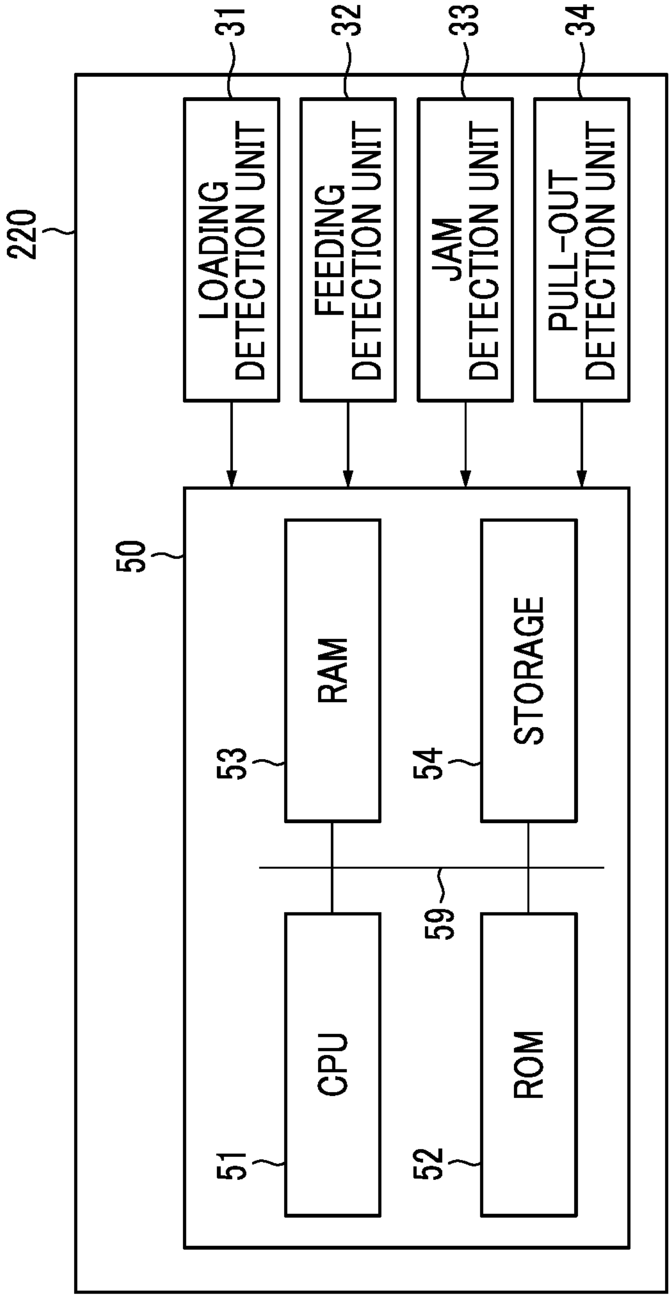
FIG. 9 is a block diagram showing an example of a hardware configuration of a feeding device according to a second exemplary embodiment.

Next, a feeding device 220 according to a second exemplary embodiment will be described. FIG. 9 is a block diagram showing an example of a hardware configuration of the feeding device 220. The identical reference numerals are assigned to the parts configured identically to the first exemplary embodiment, and the description thereof will be omitted as appropriate.

The feeding device 220 shown in FIG. 9 is to feed out the recording medium P. The feeding device 220 includes a jam detection unit 33 and a pull-out detection unit 34, in addition to the components of the feeding device 20 according to the first exemplary embodiment.

The jam detection unit 33 is a configuration unit that detects clogging (so-called jam) of the recording medium P. The jam detection unit 33 is disposed, for example, on the side downstream of the feeding roll 26 in the transport direction, which is on the side upstream of the transport member 17A in the transport direction.

In the present exemplary embodiment, the jam detection unit 33 is configured of, for example, a detection sensor that detects the recording medium P present between the feeding roll 26 and the transport member 17A. An example of the detection sensor includes a non-contact type sensor such as a transmission type or a reflection type optical sensor. The detection sensor may be, for example, a contact-type sensor that contacts a recording medium P present between the feeding roll 26 and the transport member 17A to detect the recording medium P, and various sensors can be used. The jam detection unit 33 may be configured of a detection unit common to the feeding detection unit 32.

In a case where the recording medium P present between the feeding roll 26 and the transport member 17A is detected, the jam detection unit 33 transmits, to the control device 50, presence information (that is, presence signal) indicating that the recording medium P is present between the feeding roll 26 and the transport member 17A. Therefore, in the present exemplary embodiment, the presence information is continuously transmitted to the control device 50 in a state where the recording medium P remains between the feeding roll 26 and the transport member 17A.

The pull-out detection unit 34 is a configuration unit that detects the pulling out of the feeding device body 21 from the image forming device body 11. The pull-out detection unit 34 is configured of, for example, a detection sensor that detects the feeding device body 21 in a state of being mounted on the image forming device body 11. An example of the detection sensor includes a non-contact type sensor such as a transmission type or a reflection type optical sensor. The detection sensor may be, for example, a contact-type sensor that contacts a feeding device body 21 in a state of being mounted on the image forming device body 11 to detect the feeding device body 21, and various sensors can be used.

In a case where the feeding device body 21 is pulled out from the image forming device body 11, the pull-out detection unit 34 transmits, to the control device 50, pull-out information (that is, pull-out signal) indicating that the feeding device body 21 is pulled out from the image forming device body 11.

In the control device 50 of the feeding device 220, the function of the CPU 51 is different from the function of the CPU 51 in the feeding device 20 as follows.

In the present exemplary embodiment, the CPU 51 performs the display control on the display unit 18 in a case where the feeding device body 21 including the loading unit 22 is pulled out a plurality of times while the state is maintained in which the recording medium P is loaded on the loading unit 22, as a case where the addition state occurs.

Specifically, the CPU 51 performs the display control on the display unit 18 in a case where the feeding device body 21 is pulled out a plurality of times while the feeding roll 26 is not cleaned by the cleaning pad 28, as a case where the addition state occurs.

Further, in a case where the feeding device body 21 is pulled out in a state where the recording medium P is clogged in the feeding roll 26, the CPU 51 does not include the pulling out in the number of times of pulling out of the feeding device body 21.

Furthermore, in a case where the display control is performed on the display unit 18 and then the recording medium P is exhausted from the loading unit 22, the CPU 51 performs, on the display unit 18, the end control of ending the display related to the display control.

Specifically, in a case where the display control is performed on the display unit 18 and then the feeding roll 26 is cleaned by the cleaning pad 28, the CPU 51 performs, on the display unit 18, the end control of ending the display related to the display control.

In the present exemplary embodiment, the CPU 51 executes the control program in the control device 50 to realize various functions of controlling the display unit 18. Hereinafter, a functional configuration realized by cooperation between the CPU 51 as a hardware resource and the control program as a software resource will be described.

Figure 10:
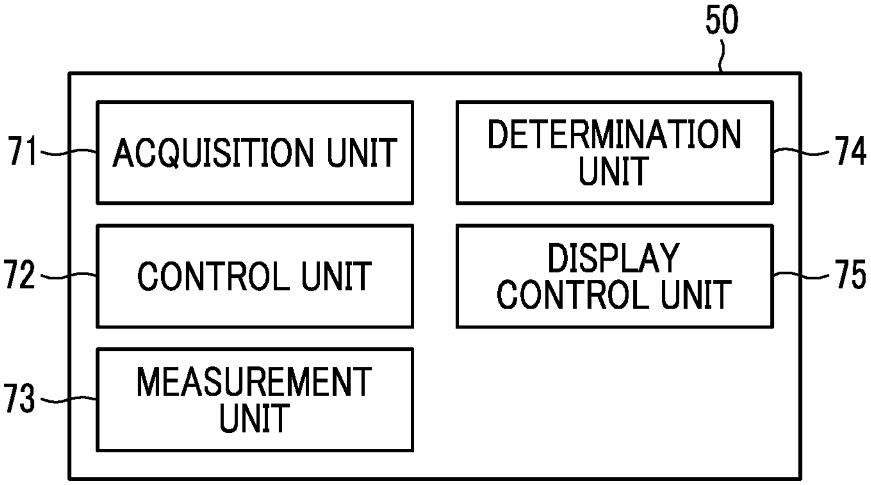
FIG. 10 is a block diagram showing an example of a functional configuration of a control device according to the second exemplary embodiment.

As an example, the control device 50 includes an acquisition unit 71, a control unit 72, a measurement unit 73, a determination unit 74, and a display control unit 75, as shown in FIG. 10.

The acquisition unit 71 acquires, from the loading detection unit 31, the loading information indicating that the recording medium P is loaded on the loading unit 22. The acquisition unit 71 acquires, from the jam detection unit 33, the presence information indicating that the recording medium P is present between the feeding roll 26 and the transport member 17A. The acquisition unit 71 acquires, from the pull-out detection unit 34, the pull-out information indicating that the feeding device body 21 is pulled out from the image forming device body 11.

In a case where the recording medium P is exhausted from the loading unit 22 (specifically, in a case where the loading information is no longer acquired from a state where the acquisition unit 71 has acquired the loading information), the control unit 72 performs, on the feeding roll 26 and the lift mechanism 24, the cleaning control of executing the cleaning operation for cleaning the feeding roll 26 by the cleaning pad 28.

The cleaning operation in the lift mechanism 24 is an operation in which the lift mechanism 24 moves up the loading unit 22 to a position where the cleaning pad 28 comes into contact with the feeding roll 26. The cleaning operation of the feeding roll 26 is an operation in which the feeding roll 26 rotates in a state where the cleaning pad 28 is in contact with the feeding roll 26.

The measurement unit 73 measures the number of times the feeding device body 21 is pulled out from the image forming device body 11. Specifically, the measurement unit 73 measures the number of times the acquisition unit 71 acquires the pull-out information.

In the present exemplary embodiment, in a case where the feeding device body 21 is pulled out in the state where the recording medium P is clogged in the feeding roll 26 (specifically, in a state where the acquisition unit 71 has acquired the presence information), the measurement unit 73 does not include the pulling out in the number of times of pulling out of the feeding device body 21.

Further, in a case where the recording medium P is exhausted from the loading unit 22 (specifically, in a case where the loading information is no longer acquired from a state where the acquisition unit 71 has acquired the loading information), the measurement unit 73 resets the measured number of times of pulling out to zero and restarts the measurement from zero. In the present exemplary embodiment, in a case where the control unit 72 executes the cleaning control, the measurement unit 73 resets the measured number of times of pulling out to zero and restarts the measurement from zero.

The determination unit 74 determines whether or not the number of times measured by the measurement unit 73 (specifically, the number of times of acquisition) exceeds the number of times of setting set in advance. Information on the number of times of setting is stored in advance in the storage 54, and the determination unit 74 refers to the information. The number of times of setting is two or more. For example, the number of times of setting is set by the number of times in a range of two or more and ten or less.

In a case where the determination unit 74 determines that the number of times of pulling out measured by the measurement unit 73 exceeds the number of times of setting, the display control unit 75 performs the display control on the display unit 18. Specifically, for the display related to the display control, for example, a message such as "Please take out all the recording media P loaded on the loading unit 22 in order to clean the feeding roll 26" is displayed on the display unit 18.

In a case where the display control is performed on the display unit 18 and then the recording medium P is exhausted from the loading unit 22 (specifically, in a case where the loading information is no longer acquired from a state where the acquisition unit 71 has acquired the loading information), the display control unit 75 performs, on the display unit 18, control (hereinafter referred to as end control) of ending the display related to the display control.

In the present exemplary embodiment, in a case where the display control is performed on the display unit 18 and then the control unit 72 executes the cleaning control, the display control unit 75 performs the end control on the display unit 18.

Control Processing According to Present Exemplary Embodiment

Figure 11:
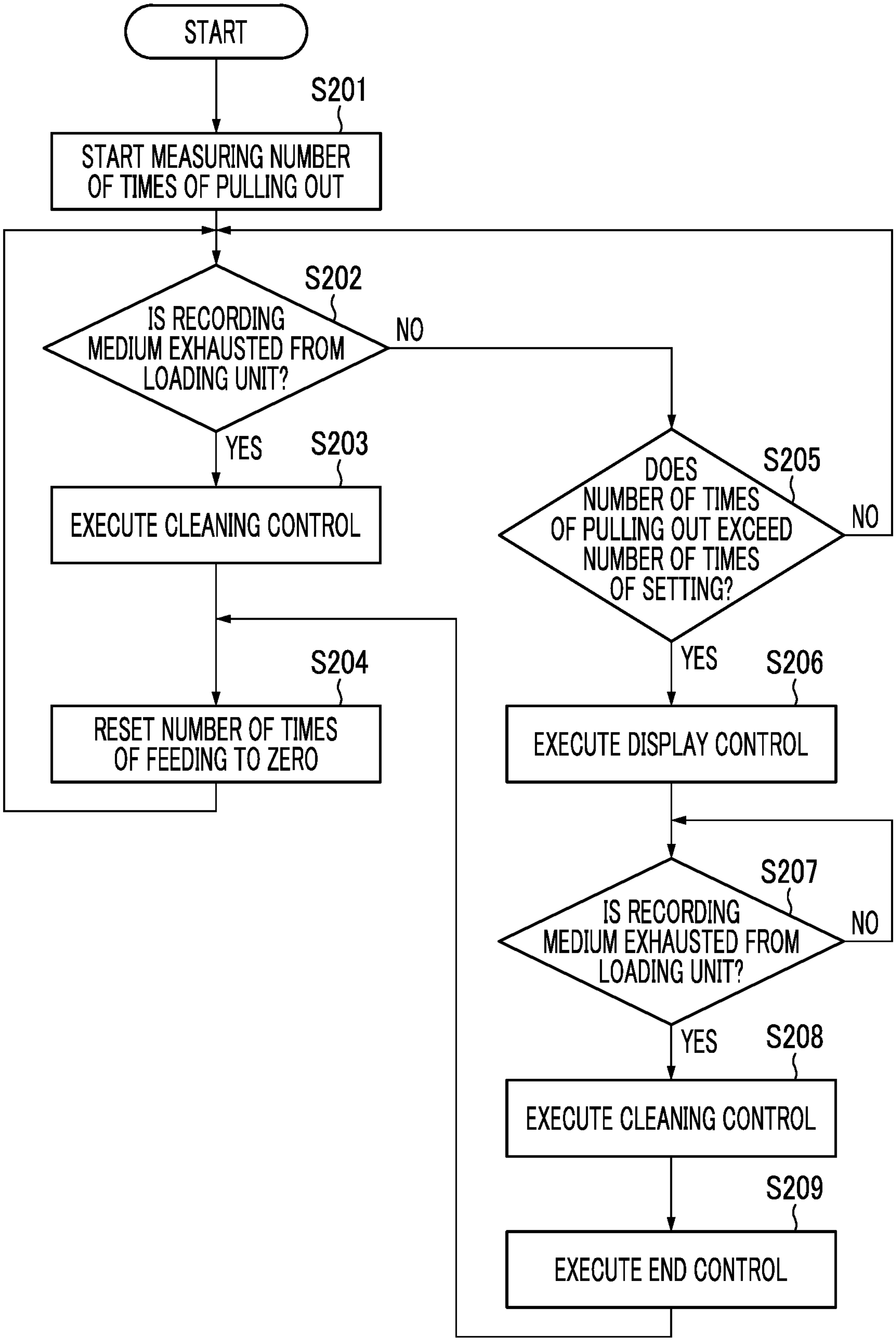
FIG. 11 is a flowchart showing an example of a flow of control processing executed by the control device according to the second exemplary embodiment.

Next, an example of control processing according to the present exemplary embodiment will be described. FIG. 11 is a flowchart showing an example of a flow of control processing executed by the control device 50.

In the present exemplary embodiment, the CPU 51 reads out the control program from the ROM 52 or the storage 54 and executes the control program to execute the present control processing. As an example, execution of the present control processing is started in a case where the image forming device 10 including the feeding device 20 starts operating (that is, in a case where power of the image forming device 10 is turned on).

As shown in FIG. 11, in a case where the present control processing is started, the CPU 51 starts measuring the number of times the feeding device body 21 is pulled out from the image forming device body 11 (step S201). The CPU 51 measures (that is, adds up) the number of times of pulling out of the feeding device body 21 each time the feeding device body 21 is pulled out from the image forming device body 11. In a case where the feeding device body 21 is pulled out in the state where the recording medium P is clogged in the feeding roll 26, the pulling out is not included in the number of times of pulling out of the feeding device body 21.

Next, the CPU 51 determines whether or not the recording medium P is exhausted from the loading unit 22 (step S202).

In a case where the recording medium P is determined to be exhausted from the loading unit 22 (YES in step S202), the CPU 51 performs, on the feeding roll 26 and the lift mechanism 24, the cleaning control of executing the cleaning operation (step S203), resets the measured number of times of pulling out to zero (step S204), and returns the processing to step S202.

On the other hand, in a case where the state is determined to be maintained in which the recording medium P is loaded on the loading unit 22 (NO in step S202), the CPU 51 determines whether or not the measured number of times of pulling out exceeds the number of times of setting set in advance (step S205).

In a case where the measured number of times of pulling out is determined to be equal to or less than the number of times of setting (NO in step S205), the CPU 51 returns the processing to step S202. In this case, the measured number of times of pulling out is not reset to zero.

On the other hand, in a case where the measured number of times of pulling out is determined to exceed the number of times of setting (YES in step S205), the CPU 51 performs the display control on the display unit 18 (step S206). Specifically, for the display related to the display control, for example, a message such as "Please take out all the recording media P loaded on the loading unit 22 in order to clean the feeding roll 26" is displayed on the display unit 18. In a case where an operation of forming an image is being performed (that is, operation of feeding the recording medium P is being performed), the display may be performed after the operation ends.

Next, the CPU 51 determines whether or not the recording medium P is exhausted from the loading unit 22 (step S207).

In a case where the recording medium P is determined to be exhausted from the loading unit 22 (YES in step S207), the CPU 51 performs the cleaning control of executing the cleaning operation on the feeding roll 26 and the lift mechanism 24 (step S208) and the end control of ending the display related to the display control in step S206 on the display unit 18 (step S209), and the processing proceeds to step S204. In the present control processing, step S208 may be executed after step S209.

On the other hand, in a case where the state is determined to be maintained in which the recording medium P is loaded on the loading unit 22 (NO in step S207), the CPU 51 repeats step S207 until the recording medium P is determined to be exhausted from the loading unit 22.

In the present control processing, in a case where the operation of the image forming device 10 is stopped (that is, in a case where the power of the image forming device 10 is turned off), the present control processing ends regardless of which step is being executed.

Action According to Present Exemplary Embodiment

In a case where the addition state occurs in which the recording medium P is added to the loading unit 22 before the recording medium P is fed out and exhausted from the loading unit 22, the CPU 51 performs, on the display unit 18, the display control of performing the display to prompt the user to take out the recording medium P from the loading unit 22.

In a case where the user takes out the recording medium P from the loading unit 22 based on this display, in the present exemplary embodiment, the feeding roll 26 and the lift mechanism 24 execute the cleaning operation of cleaning the feeding roll 26.

Therefore, according to the present exemplary embodiment, in a case where the recording medium P is added to the loading unit 22 before the recording medium P is exhausted from the loading unit 22, the feeding failure of the feeding roll 26 is suppressed as compared with a case where the CPU 51 does not execute the display control on the display unit 18.

In the present exemplary embodiment, the CPU 51 performs the display control on the display unit 18 in a case where the feeding device body 21 including the loading unit 22 is pulled out a plurality of times while the state is maintained in which the recording medium P is loaded on the loading unit 22, as a case where the addition state occurs.

In a case where the user takes out the recording medium P from the loading unit 22 based on this display, in the present exemplary embodiment, the feeding roll 26 and the lift mechanism 24 execute the cleaning operation of cleaning the feeding roll 26.

Therefore, according to the present exemplary embodiment, in a case where the feeding device body 21 is pulled out while the state is maintained in which the recording medium P is loaded on the loading unit 22, the feeding failure of the feeding roll 26 is suppressed as compared with a case where the CPU 51 does not execute the display control on the display unit 18.

Specifically, the CPU 51 performs the display control on the display unit 18 in a case where the feeding device body 21 including the loading unit 22 is pulled out a plurality of times while the feeding roll 26 is not cleaned by the cleaning pad 28, as a case where the addition state occurs.

In a case where the user takes out the recording medium P from the loading unit 22 based on this display, in the present exemplary embodiment, the feeding roll 26 and the lift mechanism 24 execute the cleaning operation of cleaning the feeding roll 26.

Therefore, according to the present exemplary embodiment, in a case where the feeding device body 21 is pulled out a plurality of times while the feeding roll 26 is not cleaned by the cleaning pad 28, the feeding failure of the feeding roll 26 is suppressed as compared with a case where the CPU 51 does not execute the display control on the display unit 18.

Further, in a case where the feeding device body 21 is pulled out in the state where the recording medium P is clogged in the feeding roll 26, the CPU 51 does not include the pulling out in the number of times of pulling out of the feeding device body 21.

Therefore, a frequency of display by the display unit 18 is reduced as compared with a case where the CPU 51 includes, in the number of times of pulling out of the feeding device body 21, the case where the feeding device body 21 is pulled out in the state where the recording medium P is clogged in the feeding roll 26.

Furthermore, in a case where the display control is performed on the display unit 18 and then the recording medium P is exhausted from the loading unit 22, the CPU 51 performs, on the display unit 18, the end control of ending the display related to the display control. Accordingly, the user is made to recognize that the taking out of the recording medium P related to the display by the display unit 18 is executed.

Specifically, in a case where the display control is performed on the display unit 18 and then the feeding roll 26 is cleaned by the cleaning pad 28, the CPU 51 performs, on the display unit 18, the end control of ending the display related to the display control. Accordingly, the user is made to recognize that the taking out of the recording medium P related to the display by the display unit 18 is executed.

First Modification Example

In the present exemplary embodiment, the CPU 51 performs only the display control on the display unit 18 in a case where the addition state occurs, but the present invention is not limited thereto. For example, the CPU 51 may perform the display control on the display unit 18 and may perform, on the feeding roll 26, prohibition control of prohibiting the feeding operation of the recording medium P in a case where the addition state occurs (refer to FIG. 12).

Further, in a case where the display control is performed on the display unit 18 and the prohibition control is performed on the feeding roll 26, and then the recording medium P is exhausted from the loading unit 22, the CPU 51 may perform the end control of ending the display related to the display control on the display unit 18 and release control of releasing the prohibition of the feeding operation of the recording medium P on the feeding roll 26.

Specifically, for example, in a case where the display control is performed on the display unit 18 and then the feeding roll 26 is cleaned by the cleaning pad 28, the CPU 51 performs the end control of ending the display related to the display control on the display unit 18 and the release control of releasing the prohibition of the feeding operation of the recording medium P on the feeding roll 26.

Figure 12:
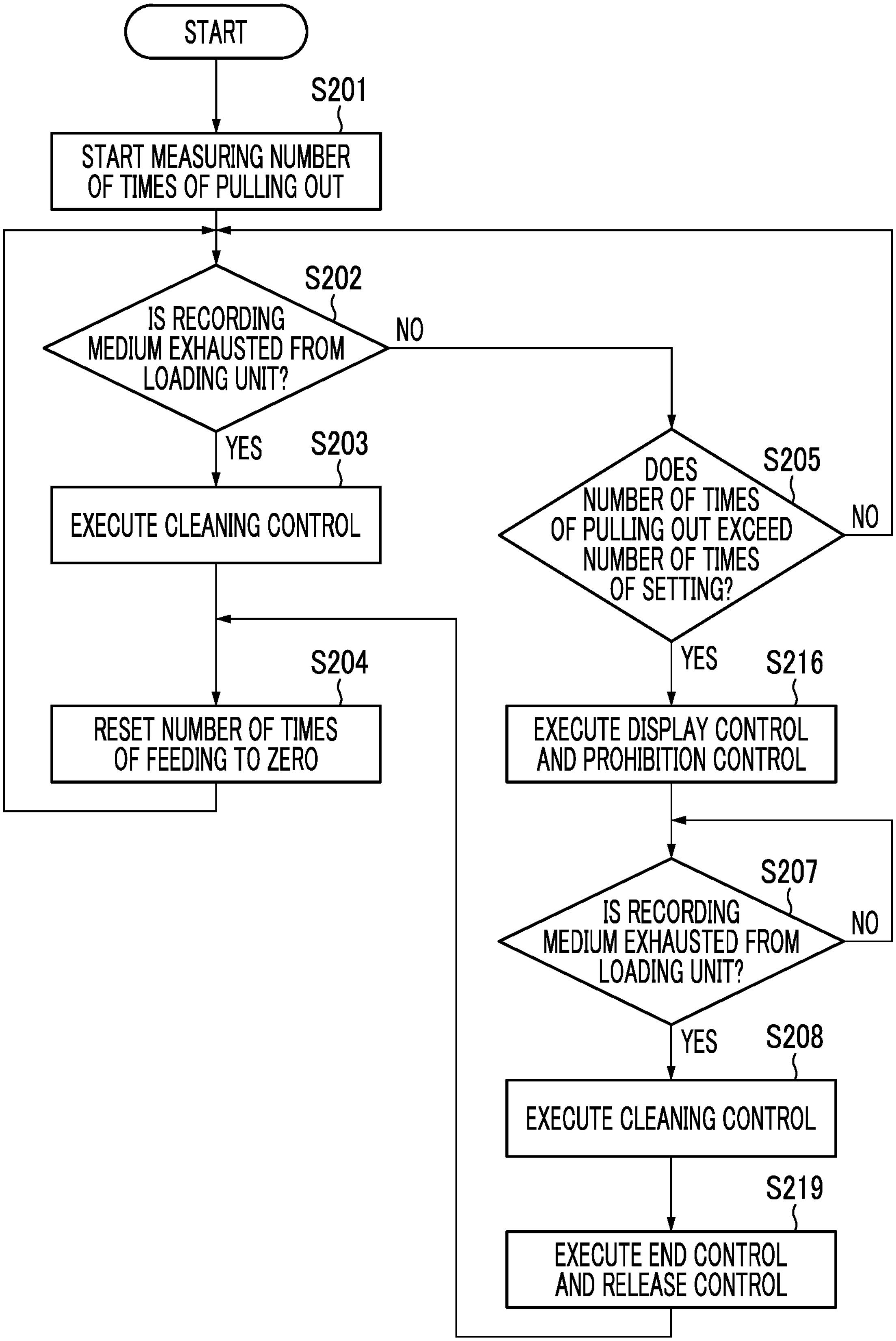
FIG. 12 is a flowchart showing an example of a flow of control processing according to a first modification example of the second exemplary embodiment.

Specifically, in the first modification example, for example, the control processing is executed, as shown in FIG. 12. In FIG. 12, the identical reference numerals are assigned to the identical parts as the control processing shown in FIG. 11, and the description thereof will be omitted as appropriate below.

In a case where the measured number of times of pulling out is determined to exceed the number of times of setting (YES in step S205), the CPU 51 performs the display control on the display unit 18 and the prohibition control of prohibiting the feeding operation of the recording medium P on the feeding roll 26 (step S216).

Specifically, for the display related to the display control, for example, a message such as "Please take out all the recording media P loaded on the loading unit 22 in order to clean the feeding roll 26" is displayed on the display unit 18. The prohibition of the feeding operation related to the prohibition control is executed by stopping a drive source that drives the feeding roll 26. In a case where an operation of forming an image is being performed (that is, operation of feeding the recording medium P is being performed), the display and the prohibition may be performed after the operation ends.

In a case where the recording medium P is determined to be exhausted from the loading unit 22 (YES in step S207), the CPU 51 performs the cleaning control of executing the cleaning operation on the feeding roll 26 and the lift mechanism 24 (step S208) and performs the end control of ending the display related to the display control in step S206 on the display unit 18 and the release control of releasing the prohibition of the feeding operation of the recording medium P on the feeding roll 26 (step S219), and the processing proceeds to step S204. In the present control processing, step S208 may be executed after step S219.

Action of First Modification Example

In a case where the addition state occurs, the CPU 51 performs the display control on the display unit 18 and performs, on the feeding roll 26, the prohibition control of prohibiting the feeding operation of the recording medium P.

Accordingly, since the user is forced to take out the recording medium P from the loading unit 22, the feeding failure of the feeding roll 26 is suppressed as compared with a case where the CPU 51 performs only the display control on the display unit 18 in a case where the addition state occurs.

Further, in a case where the display control is performed on the display unit 18 and the prohibition control is performed on the feeding roll 26, and then the recording medium P is exhausted from the loading unit 22, the CPU 51 performs the end control of ending the display related to the display control on the display unit 18 and the release control of releasing the prohibition of the feeding operation of the recording medium P on the feeding roll 26. Accordingly, the user is made to recognize that the taking out of the recording medium P related to the display by the display unit 18 is executed.

Specifically, for example, in a case where the display control is performed on the display unit 18 and then the feeding roll 26 is cleaned by the cleaning pad 28, the CPU 51 performs the end control of ending the display related to the display control on the display unit 18 and the release control of releasing the prohibition of the feeding operation of the recording medium P on the feeding roll 26. Accordingly, the user is made to recognize that the taking out of the recording medium P related to the display by the display unit 18 is executed.

Second Modification Example

In the present exemplary embodiment, the CPU 51 performs only the display control on the display unit 18 in a case where the addition state occurs, but the present invention is not limited thereto. For example, in a case where the display control is performed on the display unit 18 and then the state further occurs in which the recording medium P is added to the loading unit 22, the CPU 51 may perform, on the feeding roll 26, the prohibition control of prohibiting the feeding operation of the recording medium P in addition to the execution of the display control on the display unit 18 (refer to FIG. 13).

Further, in a case where the prohibition control of prohibiting the feeding operation of the recording medium P is performed on the feeding roll 26 in addition to the execution of the display control on the display unit 18 and then the recording medium P is exhausted from the loading unit 22, the CPU 51 may perform the end control of ending the display related to the display control on the display unit 18 and the release control of releasing the prohibition of the feeding operation of the recording medium P on the feeding roll 26.

Specifically, for example, in a case where the prohibition control of prohibiting the feeding operation of the recording medium P is performed on the feeding roll 26 in addition to the execution of the display control on the display unit 18 and then the feeding roll 26 is cleaned by the cleaning pad 28, the CPU 51 performs the end control of ending the display related to the display control on the display unit 18 and the release control of releasing the prohibition of the feeding operation of the recording medium P on the feeding roll 26.

Figure 13:
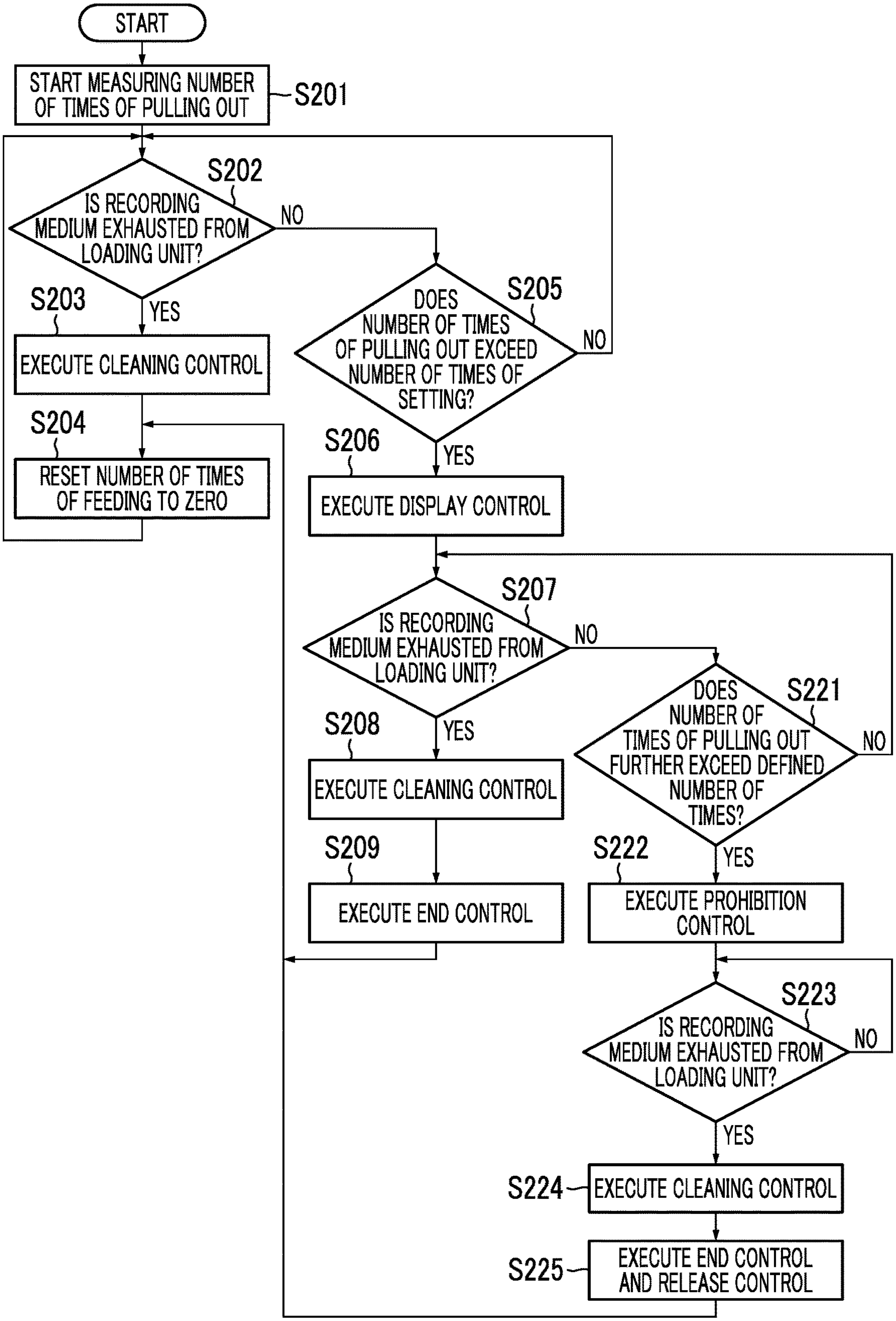
FIG. 13 is a flowchart showing an example of a flow of control processing according to a second modification example of the second exemplary embodiment.

Specifically, in the second modification example, for example, the control processing is executed, as shown in FIG. 13. In FIG. 13, the identical reference numerals are assigned to the identical parts as the control processing shown in FIG. 11, and the description thereof will be omitted as appropriate below.

In step S207, in a case where the state is determined to be maintained in which the recording medium P is loaded on the loading unit 22 (NO in step S207), the CPU 51 determines whether or not the measured number of times of pulling out further exceeds the defined number of times (step S221). The defined number of times is the number of times set in advance as a number exceeding the number of times of setting.

In a case where the measured number of times of pulling out is determined to be equal to or less than the defined number of times (NO in step S221), the CPU 51 returns the processing to step S207. In this case, the measured number of times of pulling out is not reset to zero.

On the other hand, in a case where the measured number of times of pulling out is determined to exceed the defined number of times (YES in step S221), the CPU 51 performs the prohibition control of prohibiting the feeding operation of the recording medium P on the feeding roll 26 (step S222). The prohibition of the feeding operation related to the prohibition control is executed by stopping a drive source that drives the feeding roll 26.

Next, the CPU 51 determines whether or not the recording medium P is exhausted from the loading unit 22 (step S223).

In a case where the recording medium P is determined to be exhausted from the loading unit 22 (YES in step S223), the CPU 51 performs the cleaning control of executing the cleaning operation on the feeding roll 26 and the lift mechanism 24 (step S224) and performs the end control of ending the display related to the display control on the display unit 18 and the release control of releasing the prohibition of the feeding operation of the recording medium P on the feeding roll 26 (step S225), and the processing proceeds to step S204.

On the other hand, in a case where the state is determined to be maintained in which the recording medium P is loaded on the loading unit 22 (NO in step S223), the CPU 51 repeats step S223 until the recording medium P is determined to be exhausted from the loading unit 22.

Action of Second Modification Example

In a case where the display control is performed on the display unit 18 and then the state further occurs in which the recording medium P is added to the loading unit 22, the CPU 51 performs, on the feeding roll 26, the prohibition control of prohibiting the feeding operation of the recording medium P in addition to the execution of the display control on the display unit 18.

Accordingly, since the user is forced to take out the recording medium P from the loading unit 22, in a case where the display control is performed on the display unit 18 and then the state further occurs in which the recording medium P is added to the loading unit 22, the feeding failure of the feeding roll 26 is suppressed as compared with a case where the CPU 51 performs only the display control on the display unit 18.

Further, in the present modification example, in a case where the prohibition control of prohibiting the feeding operation of the recording medium P is performed on the feeding roll 26 in addition to the execution of the display control on the display unit 18 and then the recording medium P is exhausted from the loading unit 22, the CPU 51 performs the end control of ending the display related to the display control on the display unit 18 and the release control of releasing the prohibition of the feeding operation of the recording medium P on the feeding roll 26. Accordingly, the user is made to recognize that the taking out of the recording medium P related to the display by the display unit 18 is executed.

Specifically, for example, in a case where the prohibition control of prohibiting the feeding operation of the recording medium P is performed on the feeding roll 26 in addition to the execution of the display control on the display unit 18 and then the feeding roll 26 is cleaned by the cleaning pad 28, the CPU 51 performs, on the display unit 18, the end control of ending the display related to the display control and performs, on the feeding roll 26, the release control of releasing the prohibition of the feeding operation of the recording medium P. Accordingly, the user is made to recognize that the taking out of the recording medium P related to the display by the display unit 18 is executed.

Other Modification Examples

In the present exemplary embodiment, the notification control or the like is performed in a case where the feeding device body 21 is pulled out a plurality of times, but the present invention is not limited thereto. For example, in a case where the feeding device body 21 is pulled out once, the notification control or the like may be performed.

In the present exemplary embodiment, in a case where the display control is performed on the display unit 18 and then the recording medium P is exhausted from the loading unit 22, the CPU 51 performs, on the display unit 18, the end control of ending the display related to the display control. However, the present invention is not limited thereto. In a case where the display control is performed on the display unit 18 and then the recording medium P is exhausted from the loading unit 22, the CPU 51 may be configured not to perform the end control. In this case, for example, the display related to the display control is ended by, for example, the user performing an operation of ending the display.

The present invention is not limited to the above exemplary embodiments, and various modifications, changes, and improvements can be made within a range that does not deviate from the gist thereof. For example, a plurality of the modification examples shown above may be combined as appropriate.

Supplementary Note (((1)))

A control device comprising:

a processor configured to:

perform, in a feeding device including a feeding unit that feeds out a feeding target loaded on a loading unit and a cleaning unit that cleans the feeding unit in a state where the feeding target is exhausted from the loading unit, notification control of issuing notification to prompt a user to take out the feeding target from the loading unit on a notification unit in a case where an addition state in which the feeding target is added to the loading unit occurs before the feeding target is fed out and exhausted from the loading unit.

(((2)))

The control device according to (((1))), wherein the processor is configured to:

perform the notification control on the notification unit in a case where feeding targets larger in number than the number of maximum loadings of the loading unit are fed out while a state is maintained in which the feeding target is loaded on the loading unit, as a case where the addition state occurs.

(((3)))

The control device according to (((1))) or (((2))), wherein the processor is configured to:

perform the notification control on the notification unit in a case where feeding targets larger in number than the number of maximum loadings of the loading unit are fed out while the feeding unit is not cleaned by the cleaning unit, as a case where the addition state occurs.

(((4)))

The control device according to any one of (((1))) to (((3))), wherein the processor is configured to:

perform the notification control on the notification unit in a case where the loading unit is pulled out while a state is maintained in which the feeding target is loaded on the loading unit, as a case where the addition state occurs.

(((5)))

The control device according to (((4))), wherein the processor is configured to:

perform the notification control on the notification unit in a case where the loading unit is pulled out a plurality of times set in advance while a state is maintained in which the feeding target is loaded on the loading unit, as a case where the addition state occurs.

(((6)))

The control device according to any one of (((1))) to (((5))), wherein the processor is configured to:

perform the notification control on the notification unit in a case where the loading unit is pulled out while the feeding unit is not cleaned by the cleaning unit, as a case where the addition state occurs.

(((7)))

The control device according to (((6))), wherein the processor is configured to:

perform the notification control on the notification unit in a case where the loading unit is pulled out a plurality of times set in advance while the feeding unit is not cleaned by the cleaning unit, as a case where the addition state occurs.

(((8)))

The control device according to (((5))) or (((7))), wherein the processor is configured to:

not include a case where the loading unit is pulled out in a state where the feeding target is clogged in the feeding unit in the number of times of pulling out of the loading unit.

(((9)))

The control device according to any one of (((1))) to (((8))), wherein the processor is configured to:

perform control of ending the notification on the notification unit in a case where the notification control is performed on the notification unit and then the feeding target is exhausted from the loading unit.

(((10)))

The control device according to any one of (((1))) to (((9))), wherein the processor is configured to:

perform control of ending the notification on the notification unit in a case where the notification control is performed on the notification unit and then the feeding unit is cleaned by the cleaning unit.

(((11)

The control device according to any one of (((1))) to (((10))), wherein the processor is configured to:

perform the notification control on the notification unit and prohibition control of prohibiting a feeding operation of the feeding target on the feeding unit in a case where the addition state occurs.

(((12)))

The control device according to (((11))), wherein the processor is configured to:

perform the notification control on the notification unit and perform, in a case where the prohibition control is performed on the feeding unit and then the feeding target is exhausted from the loading unit, control of ending the notification on the notification unit and control of releasing the prohibition of the feeding operation of the feeding target on the feeding unit.

(((13)))

The control device according to (((11))), wherein the processor is configured to:

perform the notification control on the notification unit and perform, in a case where the prohibition control is performed on the feeding unit and then the feeding unit is cleaned by the cleaning unit, control of ending the notification on the notification unit and control of releasing the prohibition of the feeding operation of the feeding target on the feeding unit.

(((14)))

The control device according to any one of (((1))) to (((13))), wherein the processor is configured to:

perform prohibition control of prohibiting a feeding operation of the feeding target on the feeding unit, in addition to the execution of the notification control on the notification unit, in a case where the notification control is performed on the notification unit and then the state further occurs in which the feeding target is added to the loading unit.

(((15)))

The control device according to (((14))), wherein the processor is configured to:

perform control of ending the notification on the notification unit and control of releasing the prohibition of the feeding operation of the feeding target on the feeding unit in a case where the prohibition control of prohibiting the feeding operation of the feeding target is performed on the feeding unit, in addition to the execution of the notification control on the notification unit, and then the feeding target is exhausted from the loading unit.

(((16)))

The control device according to (((14))), wherein the processor is configured to:

perform control of ending the notification on the notification unit and control of releasing the prohibition of the feeding operation of the feeding target on the feeding unit in a case where the prohibition control of prohibiting the feeding operation of the feeding target is performed on the feeding unit, in addition to the execution of the notification control on the notification unit, and then the feeding unit is cleaned by the cleaning unit.

(((17)))

A non-transitory computer readable medium storing a control program causing a computer to execute a process, the process comprising:

performing, in a feeding device including a feeding unit that feeds out a feeding target loaded on a loading unit and a cleaning unit that cleans the feeding unit in a state where the feeding target is exhausted from the loading unit, notification control of issuing notification to prompt a user to take out the feeding target from the loading unit on a notification unit in a case where an addition state in which the feeding target is added to the loading unit occurs before the feeding target is exhausted from the loading unit.

(((18)))

A feeding device comprising:

a feeding unit that feeds out a feeding target loaded on a loading unit;

a cleaning unit that cleans the feeding unit in a state where the feeding target is exhausted from the loading unit; and a notification unit that executes notification to prompt a user to take out the feeding target from the loading unit in a case where an addition state in which the feeding target is added to the loading unit occurs before the feeding target is exhausted from the loading unit.

(((19)))

An image forming device comprising:

an image forming unit that forms an image on a recording medium;

a feeding unit that feeds out a recording medium loaded on a loading unit toward the image forming unit;

a cleaning unit that cleans the feeding unit in a state where the recording medium is exhausted from the loading unit; and a notification unit that executes notification to prompt a user to take out the feeding target from the loading unit in a case where an addition state in which the feeding target is added to the loading unit occurs before the recording medium is exhausted from the loading unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:

a processor configured to:

perform, in a feeding device including a feeding roll that feeds out a feeding target loaded on a loading unit and a cleaning pad that cleans the feeding roll in a state where the feeding target is exhausted from the loading unit, notification control of issuing a notification to prompt a user to take out the feeding target from the loading unit on a notification unit a display panel or a speaker in a case where an addition state in which the feeding target is added to the loading unit occurs before the feeding target is fed out and exhausted from the loading unit; and perform the notification control on the display panel or the speaker in a case where the loading unit is pulled out a plurality of times set in advance while a state is maintained in which the feeding target is loaded on the loading unit, as a case where the addition state occurs.

2. The control device according to claim 1, wherein the processor is configured to:

perform the notification control on the display panel or the speaker in a case where feeding targets larger in number than the number of maximum loadings of the loading unit are fed out while a state is maintained in which the feeding target is loaded on the loading unit, as a case where the addition state occurs.

3. The control device according to claim 1, wherein the processor is configured to:

perform the notification control on the display panel or the speaker in a case where feeding targets larger in number than the number of maximum loadings of the loading unit are fed out while the feeding roll is not cleaned by the cleaning pad, as a case where the addition state occurs.

4. The control device according to claim 1, wherein the processor is configured to:

not include a case where the loading unit is pulled out in a state where the feeding target is clogged in the feeding roll in the number of times of pulling out of the loading unit.

5. The control device according to claim 1, wherein the processor is configured to:

perform control of ending the notification on the display panel or the speaker in a case where the notification control is performed on the display panel or the speaker and then the feeding target is exhausted from the loading unit.

6. The control device according to claim 1, wherein the processor is configured to:

perform control of ending the notification on the display panel or the speaker in a case where the notification control is performed on the display panel or the speaker and then the feeding roll is cleaned by the cleaning pad.

7. The control device according to claim 1, wherein the processor is configured to:

perform the notification control on the display panel or the speaker and prohibition control of prohibiting a feeding operation of the feeding target on the feeding roll in a case where the addition state occurs.

8. The control device according to claim 7, wherein the processor is configured to:

perform the notification control on the display panel or the speaker and perform, in a case where the prohibition control is performed on the feeding roll and then the feeding target is exhausted from the loading unit, control of ending the notification on the display panel or the speaker and control of releasing the prohibition of the feeding operation of the feeding target on the feeding roll.

9. The control device according to claim 7, wherein the processor is configured to:

perform the notification control on the display panel or the speaker and perform, in a case where the prohibition control is performed on the feeding roll and then the feeding roll is cleaned by the cleaning pad, control of ending the notification on the display panel or the speaker and control of releasing the prohibition of the feeding operation of the feeding target on the feeding roll.

10. The control device according to claim 1, wherein the processor is configured to:

perform prohibition control of prohibiting a feeding operation of the feeding target on the feeding roll, in addition to the execution of the notification control on the display panel or the speaker, in a case where the notification control is performed on the display panel or the speaker and then the state further occurs in which the feeding target is added to the loading unit.

11. The control device according to claim 10, wherein the processor is configured to:

perform control of ending the notification on the display panel or the speaker and control of releasing the prohibition of the feeding operation of the feeding target on the feeding roll in a case where the prohibition control of prohibiting the feeding operation of the feeding target is performed on the feeding roll, in addition to the execution of the notification control on the display panel or the speaker, and then the feeding target is exhausted from the loading unit.

12. The control device according to claim 10, wherein the processor is configured to:

perform control of ending the notification on the display panel or the speaker and control of releasing the prohibition of the feeding operation of the feeding target on the feeding roll in a case where the prohibition control of prohibiting the feeding operation of the feeding target is performed on the feeding roll, in addition to the execution of the notification control on the display panel or the speaker, and then the feeding roll is cleaned by the cleaning pad.

13. A control device comprising:

a processor is configured to:

perform, in a feeding device including a feeding roll that feeds out a feeding target loaded on a loading unit and a cleaning pad that cleans the feeding roll in a state where the feeding target is exhausted from the loading unit, notification control of issuing a notification to prompt a user to take out the feeding target from the loading unit on a display panel or a speaker in a case where an addition state in which the feeding target is added to the loading unit occurs before the feeding target is fed out and exhausted from the loading unit; and perform the notification control on the display panel or the speaker in a case where the loading unit is pulled out a plurality of times set in advance while the feeding roll is not cleaned by the cleaning pad, as a case where the addition state occurs.

14. The control device according to claim 13, wherein the processor is configured to:

not include a case where the loading unit is pulled out in a state where the feeding target is clogged in the feeding roll in the number of times of pulling out of the loading unit.

15. A non-transitory computer readable medium storing a control program causing a computer to execute a process, the process comprising:

performing, in a feeding device including a feeding roll that feeds out a feeding target loaded on a loading unit and a cleaning unit cleaning pad that cleans the feeding roll in a state where the feeding target is exhausted from the loading unit, notification control of issuing a notification to prompt a user to take out the feeding target from the loading unit on a display panel or a speaker in a case where an addition state in which the feeding target is added to the loading unit occurs before the feeding target is exhausted from the loading unit; and performing the notification control on the display panel or the speaker in a case where the loading unit is pulled out a plurality of times set in advance while a state is maintained in which the feeding target is loaded on the loading unit, as a case where the addition state occurs.

16. A feeding device comprising:

a feeding roll that feeds out a feeding target loaded on a loading unit;

a cleaning unit cleaning pad that cleans the feeding roll in a state where the feeding target is exhausted from the loading unit;

a display panel or a speaker that executes a notification to prompt a user to take out the feeding target from the loading unit in a case where an addition state in which the feeding target is added to the loading unit occurs before the feeding target is exhausted from the loading unit; and a processor configured to:

perform a notification control of issuing the notification to prompt the user to take out the feeding target from the loading unit on the display panel or the speaker in the case where the addition state in which the feeding target is added to the loading unit occurs before the feeding target is fed out and exhausted from the loading unit; and perform the notification control on the display panel or the speaker in a case where the loading unit is pulled out a plurality of times set in advance while a state is maintained in which the feeding target is loaded on the loading unit, as a case where the addition state occurs.

* * * * *